United States Patent [19]
Albright et al.

[11] Patent Number: 6,012,043
[45] Date of Patent: Jan. 4, 2000

[54] COMPUTERIZED SYSTEM AND METHOD USED IN FINANCIAL PLANNING

[75] Inventors: William R. Albright, Granville; Timothy W. Weller, Urbana; Matthew S. Easley, Westerville; Karen E. Szolosi, Hilliard; Philip S. Wunderlich, Upper Arlington, all of Ohio

[73] Assignee: Nationwide Mutual Insurance Co., Columbus, Ohio

[21] Appl. No.: 08/709,914

[22] Filed: Sep. 9, 1996

[51] Int. Cl.⁷ ..................................................... G06F 17/60
[52] U.S. Cl. .................................. 705/36; 705/35; 706/45
[58] Field of Search .................................. 705/30, 35, 36; 395/1, 10, 20, 21, 50, 54, 75, 77; 706/45, 46, 47

[56] References Cited

U.S. PATENT DOCUMENTS

| | | |
|---|---|---|
| 3,634,669 | 1/1972 | Soumans et al. . |
| 4,642,768 | 2/1987 | Roberts . |
| 4,648,037 | 3/1987 | Valentino . |
| 4,722,055 | 1/1988 | Roberts . |
| 4,752,877 | 6/1988 | Robert et al. . |
| 4,831,526 | 5/1989 | Luchs et al. . |
| 4,837,693 | 6/1989 | Schotz . |
| 4,839,804 | 6/1989 | Roberts et al. . |
| 4,876,648 | 10/1989 | Lloyd . |
| 4,953,085 | 8/1990 | Atkins . |
| 4,969,094 | 11/1990 | Halley et al. . |
| 4,975,840 | 12/1990 | De Tore et al. . |
| 4,992,939 | 2/1991 | Tyler . |
| 5,136,502 | 8/1992 | Van Remortel et al. . |
| 5,191,522 | 3/1993 | Bosco et al. . |
| 5,202,827 | 4/1993 | Sober . |
| 5,206,803 | 4/1993 | Vitagliano et al. . |
| 5,231,571 | 7/1993 | D'Agnostino . |
| 5,237,498 | 8/1993 | Tenma et al. . |
| 5,245,535 | 9/1993 | Weiss et al. . |
| 5,291,398 | 3/1994 | Hagan . |
| 5,383,113 | 1/1995 | Kight et al. . |
| 5,423,033 | 6/1995 | Yuen . |
| 5,429,506 | 7/1995 | Brophy et al. . |
| 5,446,885 | 8/1995 | Moore et al. . |
| 5,471,575 | 11/1995 | Glansante . |
| 5,479,344 | 12/1995 | Keziah, Jr. . |
| 5,493,490 | 2/1996 | Johnson . |
| 5,517,406 | 5/1996 | Harris et al. . |
| 5,644,727 | 7/1997 | Atkins ........................................ 705/36 |
| 5,727,161 | 3/1998 | Purcell, Jr. .................................. 705/7 |

OTHER PUBLICATIONS

"Fidelity Retirement Planning Thinkware" (no date).
"Intuit Helps You with Future Finances, But Overlooks Debt," *The Wall Street Journal*, Jun. 20, 1996.
"Personal Planning," Northwestern Mutual Life Rev. 3/94, Oct. 1993.
"Financial Profiles, Inc. on the Internet," *The Financial Profiles, Inc. Newsletter*, Winter 1996.
"Rich and Retired," Datatech Software (No date).
"Retirement Expert," Sterling Wentworth Corporation (no date).
"Aetna's Retirement Income Pathfinder" (no date).
"Quicken Financial Planner" (no date).
Next$ Manual, Sterling Wentworth Corp.,57 West 200 South, Suite 510, Salt Lake City, Utah 84101, 1992.

*Primary Examiner*—Edward R. Cosimano
*Attorney, Agent, or Firm*—Kenyon & Kenyon

[57] ABSTRACT

A computer implemented tool used primarily in [retirement planning] financial planning which produces estimated values of needed savings levels and further income based on certain economic assumptions and data regarding an individual subject's current financial status. [Although intended for use in retirement planning, the tool may also be used in other forms of financial planning.] The tool uses decision logic. User preferences are taken into account. Output is presented in a unique graphical format that can be easily understood by customers.

50 Claims, 5 Drawing Sheets

| GENERAL INFORMATION |
|---|

210 —
| MARITAL STATUS | PLEASE FILL IN THE APPROPRIATE CIRCLE. |
|---|---|
| SINGLE | ○ |
| SINGLE AND WIDOWED | ○ |
| MARRIED | ○ |

220
| NAME (FIRST, MIDDLE, AND LAST) | DATE OF BIRTH | SEX | YEAR YOU'D LIKE TO RETIRE |
|---|---|---|---|
| YOUR NAME | M/D/Y | | JANUARY 1, |
| SPOUSE'S NAME | M/D/Y | | |

(230, 240, 250)

260
| STREET ADDRESS | | |
|---|---|---|
| CITY | STATE | ZIP CODE |
| HOME PHONE ( ) | WORK PHONE ( ) | |

270 — DEPENDENTS   PLEASE LIST NAMES AND AGES OF CHILDREN CURRENTLY DECLARED ON YOUR FEDERAL INCOME TAX RETURN.

|   |   |   |
|---|---|---|
|   |   |   |
|   |   |   |

280
| SOCIAL SECURITY-MONEYVIEW ESTIMATE | | YOU | SPOUSE |
|---|---|---|---|
| WHAT IS THE TOTAL NUMBER OF YEARS YOU'VE WORKED FULL TIME AND PAID SOCIAL SECURITY TAXES? | | YRS. | YRS. |
| ARE YOU CURRENTLY PAYING SOCIAL SECURITY AT YOUR MAIN JOB? | | ○ YES ○ NO | ○ YES ○ NO |
| IF YOU'RE NOT PAYING SOCIAL SECURITY TAXES RIGHT NOW, | WHEN WAS THE LAST *FULL* YEAR YOU DID? | 19 | 19 |
| | WHAT WAS YOUR SALARY THAT YEAR? | $ | $ |

COMPUTERIZED SYSTEM AND METHOD USED IN FINANCIAL PLANNING

FIELD OF INVENTION

The present invention is directed to a computer implemented system and method used in the field of financial planning. More specifically, the present invention is directed to a computerized tool used in retirement planning that produces estimated values of needed savings levels and future income based on certain economic assumptions and data regarding an individual subject's current financial status.

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

Recent studies have shown that many people will not have saved the amount of money needed for their retirement. According to one recent study on potential shortfalls in retirement income, nearly eight out of ten households will probably have less than half of what they need to retire comfortably. Many people find saving difficult, especially when it comes to knowing how much to save.

People planning for retirement often need help in answering a number of questions, such as, for example: how many years do I need to plan for, what is the best age to retire, what if I work longer, how much money will I need when I retire, what if I save more today, what if I adjust my standard of living after I retire, how much should I be saving?

Computer systems exist that can assist in some areas relating to retirement planning. In general, these computer systems are either non-interactive and do not provide alternative strategies tailored to the user's situation or are too flexible and do not provide the guidance that most users require.

For example, some software used in retirement planning allows the user to enter the appropriate information (e.g., user's age, current income, assets, retirement goal) and the software will inform the user whether or not the user's goal has been met. If the user has not met his or her goal, the program may output a general list of things the user can do to possibly reach that goal, e.g., save more now, change investments, retire later, work part-time. However, the alternative strategies presented to the user are general, not tailored to the user's situation and do not take into account the user's preferences. Usually, there is no suggestion provided as to which alternative strategy would be the one that the user would most likely find of interest. Nor do such programs provide details (such as, for example, number of years for which income is needed, average income) of any alternative retirement strategy. Thus, these programs do not make suggestions as to how factors can be varied to more closely obtain the desired retirement goal or provide details of how the user's retirement goal could be varied to obtain other desirable retirement strategies.

Typically, if the user wishes to explore an alternative strategy, the user is required to guess what would be the most desirable factor to change, re-enter the new input and have the program again perform the calculation. Such systems are not efficient, particularly where the user does not have access to a computer and the information is collected from the user and processed in a batch process.

Other software programs used in retirement planning could be regarded as totally interactive. For example, in such programs, users can enter and modify all or most parameters and assumptions to obtain the results desired. The disadvantage of such programs is that the user may not be given enough guidance in those areas where the user is likely to have no expertise, such as, for example, rate of return, inflation, earnings growth rate, number of retirement years for which income is needed, and amount of retirement income needed each year, etc. It is not advantageous to allow users to specify or change the parameters or assumptions used by the program when the user is not an expert in such areas and, further, may not be given enough guidance by the program in the best combinations of parameters or assumptions to be used in the user's particular case and for a specific retirement scenario.

Thus, there exists a need for a system used in retirement planning that identifies not only what the user should do to reach the user's specified retirement goal but, additionally, anticipates other strategies of likely interest to the user, taking into account the user's priorities, and further, provides the user with the details of the alternative strategies without the need for further user intervention. It would be beneficial for such a system used in retirement planning to determine, as part of the alternative strategies, the combinations of assumptions to be used, particularly assumptions relating to areas in which a typical user is unlikely to have special skill (such as rate of return over possibly long periods of time). It would also be desirable to select such assumptions so they are consistent with each other and are based upon personal characteristics of the particular user where appropriate.

There further exists a need for a system used in retirement planning that provides a number of alternative retirement strategies and also selects one or more retirement strategies (including the detailed components thereof) that, based on user preferences, would most likely be of interest to a user.

It would be desirable if such a system enabled the user to provide input on only one occasion (for example, so that the system could be efficiently operated on a batch basis for those who do not have access to a computer). Most desirably, such a system should anticipate certain user questions and provide details of alternative strategies likely to be of interest to the user without the need for additional user intervention.

There further exists a need for a system used in retirement planning that provides information to the user in a written and graphical format that is easy to comprehend. Where alternative strategies are presented, it would be desirable if each strategy is presented so as to be easily compared with the other strategies.

SUMMARY OF THE INVENTION

Taking into account a customer's preferences, the present invention determines a number of financial scenarios for the customer and, from these selects the scenarios likely to contain useful information for the customer to be presented to the customer in a report. Further, the present invention, again taking into account a customer's preferences, highlights one or more of the feasible scenarios the customer is especially likely to find of interest.

In the embodiment described herein, the present invention is described in the context of planning for retirement.

However, the invention is not so limited, and can be used for other financial planning, such as, for example, planning for college funding, planning for a major asset purchase, planning for insurance needs, etc.

When used herein, the term "customer" refers to the person who is the subject of the financial calculations. In using the present invention, the customer may be assisted by a professional financial planner or agent. The customer need not be the person who actually enters information into the system—the information also may be entered, for example, by a data entry operator, by computerized scanning methods, by a financial planning professional or traveling insurance agent.

In the representative embodiment, the present invention includes an expert system comprising a set of decision rules. The expert system is part of or is used by a software system used in retirement planning. In summary, the software used in retirement planning is designed to perform financial calculations with respect to a customer's retirement savings and other savings plans. The calculations of the software used in retirement planning are based upon financial and other input data provided by the customer. The output of the software is a report, provided to the customer, which includes financial estimates and other information to help the customer evaluate the feasibility of retiring at a number of future retirement dates or ages.

One of the features of the report is that it provides the customer with the estimated savings levels required for a selected set of distinct retirement scenarios. (In the representative embodiment, eighteen retirement scenarios are included in the report.) The expert system of the present invention determines which retirement scenarios, including which retirement dates, expense levels and rates or return, are to be included in the customer's report.

Further, the report highlights or focuses the customer's attention on two specific retirement scenarios which are expected to be of particular interest to the customer. The expert system of the present invention determines which two scenarios are to be highlighted.

As discussed in further detail below, the expert system comprises a set of decision rules which operate to "customize" the processing and output of the software system used in retirement planning for each customer, based on certain customer-specific input data and preliminary calculations of the software system. The decision rules define the logic used to make decisions which, in turn, becomes additional inputs to the software system used in retirement planning for the purpose of customizing the output presented to the customer in the report.

In further detail, the software used in retirement planning of the present invention is executed by a computer processor. The computer processor executing this software can operate from one of a number of locations. For example, the software used in retirement planning can execute on a customer's personal computer or on the laptop computer of a financial planner. Alternatively, the software can execute on a centrally located computer, where, for example, input is received electronically from a customer using a computer or terminal at a remote location. Thus, it will be appreciated that input can be received from a customer (and output presented to the customer) via the Internet. Additionally, the customer may provide input in written form, which is scanned in or entered into the system in batch mode by data entry operators. The software used in retirement planning utilizes actuarial life expectancies, historical data, economic variables and results of consumer research in performing its tasks.

In the representative embodiment, the customer completes a questionnaire that requests information about the customer and his or her present financial position and financial preferences (and, if applicable, those of the customer's family). The questionnaire can be in electronic form (e.g., completed at a computer by entering information that is displayed in an electronic form on the screen of the computer) or in printed form. In the representative embodiment of the present invention, the customer provides as input information about the customer's present financial situation, and other personal information, as well as preferences relating to the customer's future objectives. For example, the customer provides information relating to investment risk tolerance, preferences as to which changes in future lifestyle the customer would find most acceptable, and the date the customer would like to retire.

Thus, the questionnaire includes questions relating to age, sex, marital status, number of dependents, current yearly income, current health insurance, retiree health insurance, social security, customer's ability to handle investment risk (used in part to make an assumption for the rate of return investments could earn), defined benefit pensions and other employer sponsored savings plans available (e.g., 401 (K) and Keogh plans), current personal savings, current real estate and mortgage(s), life insurance, household loans and debts and other major anticipated expenses. The questionnaire also asks the customer to rank in order of preference the following steps that the customer could take to ensure a more comfortable life in retirement: (a) save more now; (b) work longer; and (c) reduce standard of living in retirement. Further, the customer is asked to specify the date (e.g., year) which the customer wishes to retire. The questionnaire can be customized for particular types of customers, e.g., all employees of a particular company, customers having a certain occupation, customers in a particular state or geographic region, etc.

The information received in response to the questionnaire is supplied to the software used in retirement planning for processing. Using this information, the present invention estimates how much the customer should save each year until retirement for the scenario that the customer indicated as most desirable, and uses these results as well as the customer's preferences relating to future objectives to evaluate alternative retirement funding scenarios.

The overall output of the software used in retirement planning includes a number of retirement scenarios that are likely to comprise information that is interesting for the customer. In the representative embodiment, based on the information provided by the customer, a customized set of eighteen distinct retirement scenarios are provided to the customer in a report. Two of these scenarios are selected by the expert system as the scenarios that the customer is especially likely to find of interest.

Thus, the present invention, using the information from the questionnaire, creates customized projections for the customer. The present invention helps the customer determine the best age to retire and how much money the customer will need in retirement, what amount the customer's savings can provide and how much the customer should be saving now. The customer is provided with alternative scenarios, for different rates of return, different standards of living in retirement, and different retirement dates.

In further detail, based on the information provided by the customer, the software used in retirement planning estimates the income needed each year in retirement ("needed income"). The calculation for needed income takes into account that as current debt payments are reduced, so is the need for income. Other assumptions include (i) when the customer retires, there is probably no need to continue to save for retirement; (ii) if you need less income, you may pay less tax; (iii) health insurance costs will probably go up in retirement; (iv) the customer will not be paying FICA taxes if not working; (v) basic living expenses are assumed to grow at the general inflation rate, which is assumed to be 4%; and (vi) health insurance cost and anticipated college expenses are assumed to increase at a rate greater than the general inflation rate.

The present invention takes into account the actual financial circumstances of the customer. For example, the present invention will determine that a customer will need more income in the early years of retirement if the customer will still be paying for a child's college and mortgage payments in the first few years of retirement.

In the representative embodiment, the software used in retirement planning estimates the number of years that the customer will be retired, i.e., years from retirement until death. Life expectancy can be based on standard actuarial tables, such as Society Of Actuaries 1983 Table A, individual annuitant mortality. Modifications can be made to such tables to obtain more conservative results, since modern medical advances and improved lifestyle are increasing life expectancies.

For couples, the present invention takes into account combined income and combined income needs. If one partner's adjusted life expectancy is longer, the present invention estimates a lower income need for the balance of the life expectancy period when only one person is expected to be alive.

The software used in retirement planning of the present invention estimates the customer's retirement income each year in retirement (e.g., from pensions, current savings, social security, etc.) and determines the additional retirement income still needed to obtain the total needed income (all in today's dollars). For example, if the customer's needed income averages $43,600 over the whole retirement period, and the customer receives a $32,800 a year pension on average, then the customer will still need an average of $10,800 each year. The software then estimates the amount the customer should save per year, based upon a hypothetical rate of return on savings, to retire on the customer's desired retirement date.

To further assist the customer, the present invention provides details as to other possible retirement scenarios, setting forth the different savings levels needed should the customer decide to retire on a different date, or given a different rate of return, or should the customer decide to spend more or less in retirement. The expert system of the present invention determines which retirement scenarios to present to the customer. Two retirement scenarios are selected by the expert system as those likely to be of the most interest to the customer given the customer's financial position, goals and preferences. Thus, a number of retirement scenarios are calculated and evaluated by the present invention (different retirement ages, different rates of return, different standards of living in retirement), but only a subset are provided to the customer, and a subset of those are marked as especially likely to be of particular interest to the customer.

The expert system of the present invention uses decision rules for selecting the retirement scenarios for customers. Some of the decisions made by the expert system include:

(a) determining the rate of return assumptions for the scenarios shown to the customer, based upon the customer's tolerance to investment risk, the average length of time savings will remain invested and historical investment returns.

(b) determining whether an increase or decrease the customer's standard of living in retirement would be shown in retirement, and by how much.

(c) selecting which retirement dates to show.

(d) determining which retirement scenarios come closest to meeting the customer's retirement goals and preferences (e.g., the retirement scenario to star on each graph as discussed below).

In the representative embodiment, the retirement scenarios are provided to the customer in the form of two graphs (or charts). One graph represents different options to maintain the customer's current standard of living in retirement. The second graph represents the different options to reach an alternative standard of living in retirement. (Thus, the present invention can present retirement scenarios based upon different expense levels. A 100% expense level assumes the same standard of living the customer currently has.)

Each graph has two axes. One axis represents retirement years and the other axis represents a yearly savings level (specifying how much to save per year in today's dollars). On each graph are a number of colored plots (or lines), each line representing a rate of return. Each line has a number of marked points, each point representing a specific retirement scenario, i.e., the estimated amount the customer needs to save per year to retire at the year specified, assuming the given rate of return and the standard of living for the graph.

The present invention selects and marks (e.g., with a star) on each graph the option (retirement year, solution savings level and rate of return) that is likely to be of most interest to the customer—the retirement scenario that comes closest to meeting the customer's retirement goals. The customer's retirement goals are determined by the present invention based upon the preferences (e.g., investment risk tolerance, desired retirement age; save more now; work longer; reduce expenses in retirement) specified by the customer.

Each graph can also show the customer's current savings level.

Additionally, the present invention can provide to the customer detailed information for each retirement scenario, setting forth some of the parameters used to calculate each plan, e.g., the following information can be provided in table or spreadsheet form: customer's age, adjusted life expectancy, number of retirement years for which income is needed, average income needed each year in retirement, income available from total savings to date, other sources of retirement income, additional retirement income still needed, amount to save each year, rates of return.

For convenience of the customer, the present invention decreases future dollar amounts to the same buying power in today's dollars.

The information provided to the customer can be in electronic form (e.g., shown on the screen of a computer, e-mailed to the customer, provided on computer disk, etc.) or in printed form (e.g., a booklet). The information provided can have "personalized" text that is included based upon the customer's input and decisions made by the present invention.

In the representative embodiment, the present invention calculates and evaluates a large number of retirement scenarios and then the expert system selects from these nine scenarios to show on each graph. (In alternative embodiments, the initial calculations can be used to determine the retirement scenarios to evaluated in later calculations, so that only information about those retirement scenarios are calculated.)

It will be appreciated that the present invention allows a customer to explore alternatives in an "semi-interactive" fashion. Although, in the typical case, the customer provides input on only one occasion (i.e., via the questionnaire), the present invention anticipates, based on customer priorities indicated in the questionnaire, what other scenarios would be of interest to the customer, and also provides details of these scenarios to the customer. This allows customers to explore alternatives that are within the guidelines (priorities) initially indicated by the customer. However, the customer is provided with direction and assistance, as the present invention evaluates which strategies likely would be of most interest to the customer, based upon customer priorities. Thus, in summary, the present invention can present to the customer the retirement strategy that the customer indicated would be most desirable to the customer as well as other planning options that the customer probably would be interested in based upon the information provided by the customer (e.g., based, in part, on adjustments to the customer's retirement goals that the customer would likely find most agreeable).

In the representative embodiment, the present invention does not allow the customer to make assumptions or changes to certain parameters used in the decision-making process. For example, the present invention can be implemented to prevent the customer from making changes to assumptions about future interest rates—this is a complex area in which the customer is unlikely to have expertise. (The present invention uses sophisticated financial models and techniques to determine which future interest rates to assume for a customer.) This approach provides additional benefits, such as, for example, consistency in results if the present invention is operated by different people. Thus, for example, a large financial institution may provide the present invention to a number of its agents with the knowledge that different agents should obtain the same results for the same input parameters.

BRIEF DESCRIPTION OF THE DRAWINGS

FIG. 2 illustrates a portion of a questionnaire completed by a customer;

DETAILED DESCRIPTION

Figure 1:
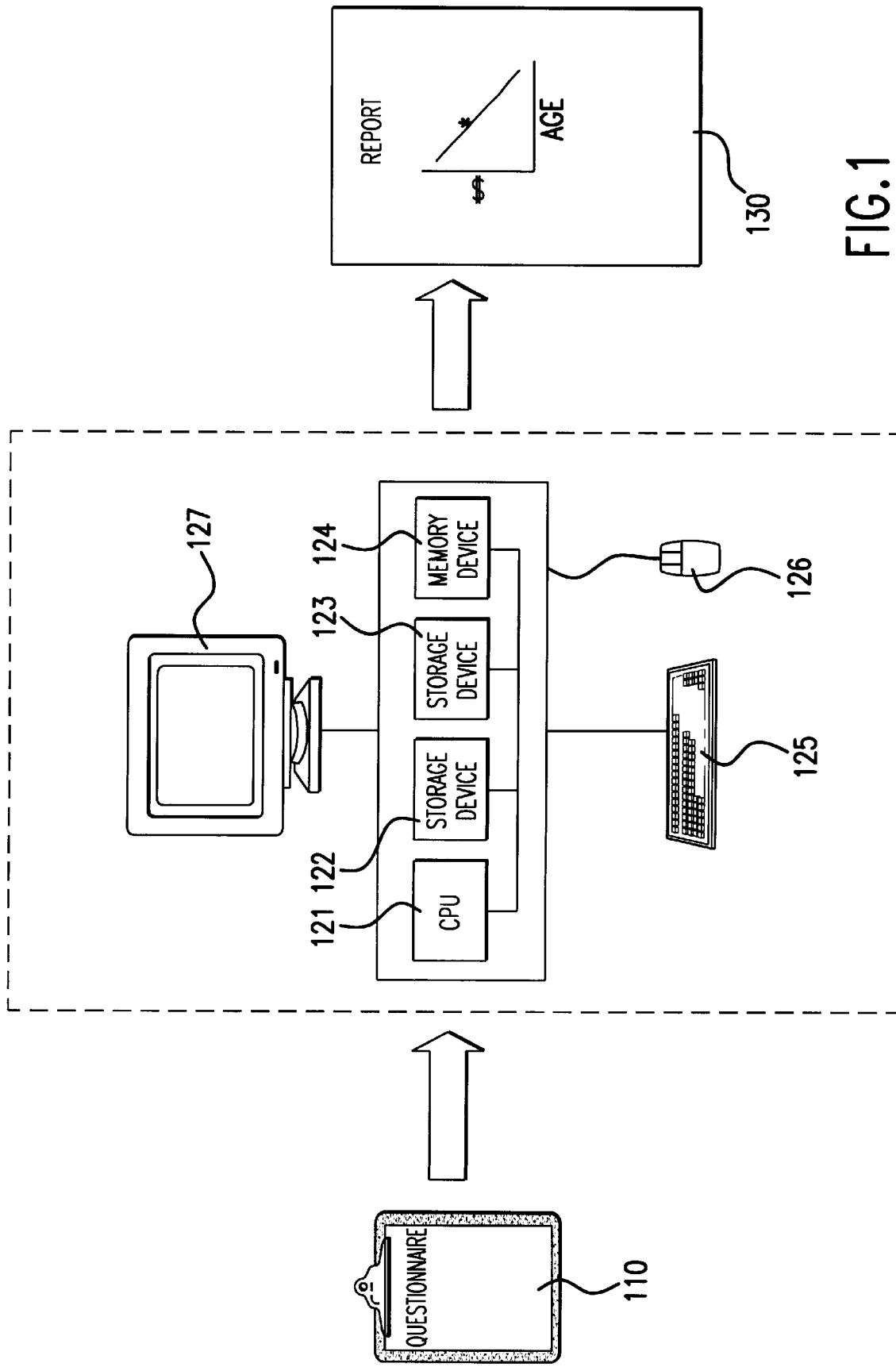
FIG. 1 is a system diagram of an exemplary embodiment of the present invention.

Referring now to the drawings, and initially FIG. 1, there is illustrated a system overview of an exemplary embodiment of the present invention. Information about a customer's financial position and financial and retirement goals is collected from the customer. Typically, the customer is provided with a questionnaire 110 to complete. The questionnaire 110 may be a paper form, or alternatively, may be in electronic form.

In a representative embodiment of the present invention, a customer completes the questionnaire 110 identifying retirement goals. Furthermore, the customer provides in the questionnaire 110 information related to current income, saving, and spending levels, and identifies how much risk the customer is willing to take with investments. Also, the customer prioritizes the adjustments to the customer's retirement goals the customer is willing to make in order to ensure a more comfortable life in retirement. For example, is the customer willing to work longer, save more money now, or reduce expenses in retirement?

The responses to the questionnaire 110 are used as input to a computer program, i.e., the software used in retirement planning, executing in a computer system 120. In the representative embodiment, the computer system 120 comprises a central processing unit 121 for executing computer programs and managing and controlling the operation of the computer system 120. A storage device 122, such as a floppy disk drive, is coupled to the central processing unit 121 for, e.g., reading and writing data and computer programs to and from removable storage media such as floppy disks. Storage device 123, coupled to the central processing unit 121, also provides a means for storing computer programs and data. Storage device 122 is preferably a hard disk having a high storage capacity. A dynamic memory device 124 such as a RAM, is coupled to the central processing unit 121. The computer system 120 includes typical input/output devices, such as, for example, a keyboard 125, a mouse 126 and a monitor 127.

The computer system 120 (executing the software used in retirement planning) processes the customer's responses to the questions in questionnaire 110 and provides the customer with a report 130. The report 130 may be printed by the computer system 120 or may be provided electronically to the customer or the customer's financial advisor, e.g., via the Internet, on disk, on a computer screen. The report 130 provides the customer with a number of retirement planning options.

Questionnaire: FIG. 2 illustrates a portion of the questionnaire 110 that a customer completes. As shown, the customer is asked to provide certain basic information concerning the customer and the customer's spouse. Such information includes, for example, marital status 210, name of the customer and the customer's spouse 220, respective dates of birth 230, gender of each spouse 240, and the year that the customer wishes to retire 250. The customer further provides a street address and home and work telephone numbers 260, and names and ages of dependent children 270. The customer is also asked questions related to Social Security 280.

The customer is also asked to provide information related to the following:

current income;

defined benefit information;

current and future health care coverage (e.g., cost of health insurance);

investment risk profile, i.e., the customer's ability to handle financial risk and the customer's willingness to take financial risk;

retirement savings, i.e., money the customer and the customer's spouse is saving through their respective workplaces;

personal savings and assets (current balances and current value);

real estate (e.g., the value of the customer's home and other property, mortgage balances, and rental payments);

life insurance (both term and permanent);

household loans and debts; and anticipated expenses (including, for example, the cost of college education for children).

The customer is asked to rank the positive steps the customer could take to ensure a more comfortable life in retirement. Specifically, the customer is asked to rank, in order from 1 to 3, what the customer is willing to do in terms of adjustments to his or her retirement goals:

Save more now;

Work longer; and

Reduce expenses in retirement.

Financial Planning Software: Once the customer completes the questionnaire 110, the responses are used as input to the software used in retirement planning executing on the computer system 120. The responses may be input directly by the customer (e.g., at a computer in a financial advisor's office or at a home computer) or by a data entry operator. Specifically, the input fields listed in table 1 (below) are derived from the customer's questionnaire responses:

TABLE 1

| Input Field | Description |
|---|---|
| IP | INVESTOR PROFILE = C, M, or A (i.e., conservative, moderate, or aggressive)= Result of scoring customers's responses to investment profile questions in the questionnaire. |
| $_S$RANK | 1,2, or 3 = Customer's preference ranking of "Save More" relative to two other retirement alternatives (1 - most preferred). |
| $_R$RANK | 1,2, or 3 = Customer's preference ranking of "Reduce Retirement Expenses" relative to two other retirement alternatives (1 - most preferred). |
| $_W$RANK | 1,2, or 3 = Customer's preference ranking of "Work Longer" relative to two other retirement alternatives (1 - most preferred). |
| $SS^I_{(x,e\%)}$ | ESTIMATED SAVINGS LEVEL = Annual savings amount (in today's dollars) required to sufficiently fund customer's retirement scenario assuming retirement at customer's age x with retirement expense level based on e% replacement of basic living expenses and rate of return I. The estimated savings level includes any employer savings (ES), and should be calculated for customer ages 50 through 70 inclusive, retirement expense levels and rates of return as needed by the decision logic or failure processing. |
| PA | PREFERRED AGE = Customer's retirement age as specified in questionnaire. |
| CI | CURRENT INCOME = Customer and spouse (if any) combined current income from all sources. |
| CS | CURRENT SAVINGS = Customer (and spouse, if any) current annual savings through workplace Defined Contribution Retirement Plans (including estimated employer contributions) plus combined current annual savings through Cash Value Life Insurance or other Personal Savings/Assets. |
| ES | EMPLOYER SAVINGS = Estimated annual employer contributions to customer's (and spouse's) workplace Defined Contribution Retirement Plans. |
| OS% | OUT-OF-POCKET % = CURRENT SAVINGS (excluding EMPLOYER SAVINGS) as % of CURRENT INCOME = (CS − ES)/CI. |
| MO | MAXIMUM OUT-OF-POCKET SAVINGS (customer & spouse combined) as % of annual combined income. Values of this variable are defined in *Maximum Savings Tables* (below) as a function of CURRENT INCOME (CI) and OUT-OF-POCKET SAVINGS%(OS%). |
| ME | MAXIMUM EMPLOYER SAVINGS = Maximum amount of annual employer contributions to workplace Defined Contribution Retirement Plans as % of annual customer & spouse combined income. |
| RO | HOMEOWNER STATUS = "Renter" or "Owner." |
| MR% | MINIMUM REPLACEMENT % = Minimum allowable replacement % in basic living expenses replaced during retirement under the second retirement expense level shown in the Outlook report. Values of this variable are a function of CURRENT INCOME (CI) and HOMEOWNER STATUS |

TABLE 1-continued

| Input Field | Description |
|---|---|
| | (RO) and are defined in *Minimum Replacement Tables* (below). |
| $RR^I_{(x,e\%)}$ | Expense Replacement Ratio assuming retirement at customer's age x and with retirement expense level based on e% replacement of basic living expenses and rate of return I. Whenever an $SS^I_{(x,e\%)}$ is calculated, $RR^I_{(x,e\%)}$ should be calculated with the corresponding values for x, e% and I. |
| $TH^I_x$ | INVESTMENT TIME HORIZON = Average weighted future time that assets are expected to remain invested assuming retirement at customer's x for e%=100 and rate of return I. This value is calculated by subtracting the average weighted time of investment deposits from the average weighted time of investment liquidations for all current and future amounts saved under workplace Defined Contribution Retirement Plans, Cash Value Life Insurance, and other Personal Savings/Assets. Time is measured from the middle of the current calendar year, with all current savings amounts assumed to be deposited at t=O. Weightings are the discounted values (at time t=O) of deposit and liquidation amounts. Values of $TH^I_x$ should be calculated as needed by the decision logic or failure processing. |
| CMS | Customer's marital status. |
| CA | Customer's current age |
| SA | Spouse's Age |
| $TH^{-I}_{PA}$ | Initial Investment Time Horizon, calculated as $TH^I_x$ above, but using an initial assumed rate of return I as follows: Conservative Investor Profile -- Assumed Interest Rate = 6.5% Moderate Investor Profile -- Assumed Interest Rate = 8.0% Aggressive Investor Profile -- Assumed Interest Rate = 9.0% |
| $i_x$ | Interest rate for the $TH^I_x$ according to the Middle Interest Rate Table |

In the exemplary embodiment of the present invention, the software used in retirement planning includes an expert system comprising a set of decisions rules which operate to customize the processing and output of the system for each customer based on customer-specified input. Certain constraints limit the freedom in the decisions, and, in some cases, force certain decisions to be consistent for all customers. These constraints easily can be added to, deleted or varied, depending upon the complexity and flexibility of the system required. In the representative embodiment, they include the following:

Two different expense levels are always selected.

The first expense level is always based on 100% replacement of "basic living expenses."

Three different rates of return are always selected. The same three rates are used for both expense levels. (See section (a) below).

The spread between the middle rate of return and the low rate is always the same as the spread between the middle rate and the high rate. (See section (a) below).

Three different retirement dates are always selected. The same three dates are used for both expense levels and all three rates of return.

The retirement date specified by the customer in the questionnaire is always included as one of the three retirement dates.

Only retirement ages 50 through 70 inclusively are considered. Any references to an age greater than 70 is set to age 70.

The two retirement plans selected for highlighting are always based on the middle rate of return.

Based on the input fields and the decision constraints (both described above), the expert system determines values for eight output fields as illustrated in table 2 (below):

TABLE 2

| Output Field | Description |
| --- | --- |
| $ROR_{mid}$ | middle rate of return assumption |
| $ROR_{spread}$ | difference between middle rate of return and high or low rate of return assumptions |
| $STAR_1$ | retirement age to be highlighted for the first expense level (100% basic living expenses) |
| e% | % of basic living expenses to be replaced in retirement under the second expense level. |
| $STAR_2$ | retirement age to be highlighted for the second expense level. |
| $AA_1$ | additional retirement age to be included in Outlook graphs (optional) |
| $AA_2$ | additional retirement age to be included in Outlook graphs (optional) |
| Error Code | the number of the fail parameter that cause the failure; 0 if the case does not fail. |

Using these output fields, the customer report 130 can be generated illustrating, for example, eighteen different retirement scenarios.

The following description includes the rules and representative example parameters that can be used by the expert system of the present invention. It will be appreciated that the parameters set forth below may be varied/refined to suit the particular circumstances of use and the customer base utilizing the invention, according to factors, such as, current tax laws, customer expectations, geographic area of use, etc. An expert or group of experts familiar with the intended application of the system of the present invention should determine the exact parameters to be used for any application of the present invention.

(A) Selection of Rate of Return and Interest Rate Spread

Three rate of return assumptions are determined as a function of INITIAL INVESTMENT TIME HORIZON ($TH^I_{PA}$) and INVESTOR PROFILE (IP). In the exemplary embodiment, the middle rate of return on investments is selected in accordance with the Middle Interest Rate table (table 3) below:

TABLE 3

Middle Interest Rate

| IP | Time Horizon | | | | | | |
| --- | --- | --- | --- | --- | --- | --- | --- |
|  | 0–4.9 | 5–9.9 | 10–14.9 | 15–19.9 | 20–24.9 | 25–29.9 | 30+ |
| C | 4.50% | 5.00% | 5.50% | 6.00% | 6.50% | 7.00% | 7.00% |
| M | 5.00% | 6.00% | 7.00% | 7.50% | 8.00% | 8.50% | 8.50% |
| A | 5.00% | 6.50% | 7.50% | 8.50% | 9.00% | 9.00% | 9.50% |

The spread between the middle rate of return and the low rate (and also the between the middle rate and the high rate) is determined in accordance with the Interest Rate Spread Table below (table 4):

TABLE 4

| IP | Interest Rate Spread |
| --- | --- |
| C | 1.00% |
| M | 1.5% |
| A | 2.00% |

(B) Customer Preferences Groups

A key set of input data upon which system planning decisions are based is the customer's preference ranking (CPR) of three possible actions that could be taken to modify his or her retirement strategy: save more now, reduce expenses in retirement, and work longer. There are six possible CPR combinations as illustrated in table 5 (below):

TABLE 5

| RANK 1 | RANK 2 | RANK 3 |
| --- | --- | --- |
| SAVE | REDUCE | WORK |
| SAVE | WORK | REDUCE |
| REDUCE | SAVE | WORK |
| REDUCE | WORK | SAVE |
| WORK | REDUCE | SAVE |
| WORK | SAVE | REDUCE |

In the exemplary embodiment of the present invention, the retirement system determines retirement scenarios for the customer based, in part, on the customer's priorities. A separate set of decision rules are used for each CPR combination. However, for all six combinations, the general program flow is the same.

Figure 3:
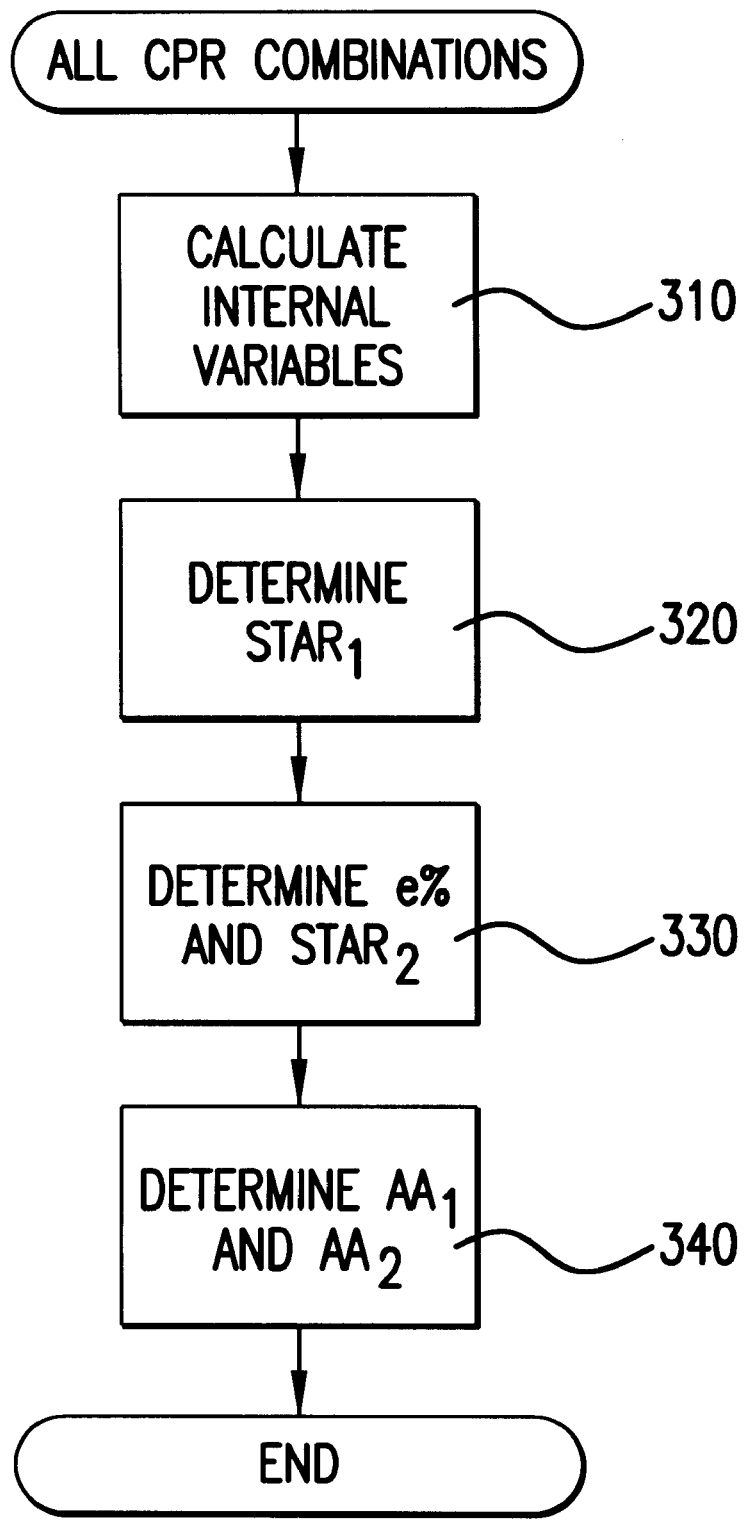
FIG. 3 is a flowchart of the planning decision system software of the exemplary embodiment of the present invention.

Referring to FIG. 3, internal variables are first calculated (step 310). Next, $STAR_1$, the retirement age to be highlighted for the first retirement expense level is determined (step 320). $STAR_2$, the retirement age to be highlighted for the second retirement expense level, and e%, the percent of basic living expenses to be replaced in retirement under the second retirement expense level are then determined (step 330). Finally, $AA_1$ and $AA_2$, additional retirement years to be included in the report graphs are calculated (step 340).

(1) SAVE/REDUCE/WORK

If the customer falls into the "SAVE/REDUCE/WORK" CPR group, the customer has identified the priorities of adjustments to retirement goals as follows:

(1) save more money now;

(2) reduce expenses in retirement; and (3) work longer.

Here, since the customer has ranked "work longer" last, the system assumes that retirement at the customer's preferred age is most important to the customer. Accordingly, if the system determines that the customer cannot adequately fund retirement at the preferred retirement age with 100% of basic living expenses replaced in retirement, considering the customer's current savings level, the system will determine feasible retirement options, (i) at the expense of saving more money now (i.e., answering the question what if the customer saves more money now?); (ii) if necessary, at the expense of reducing expenses during retirement; and, (iii) as a last resort, at the expense of increasing age of retirement.

Even if the customer can adequately fund retirement at the preferred retirement age with 100% of basic living expenses replaced in retirement, considering the customer's current savings level, the system will determine retirement scenarios taking into account customer's priorities. For example, the system may determine a scenario showing the feasibility of retiring at an earlier age if current savings are increased.

With respect to the CPR combination SAVE/REDUCE/WORK, three internal variables are calculated in step 310. Table 6 (below) sets forth each internal variable and a brief description of how they are defined:

TABLE 6

| Internal Variable | Description |
|---|---|
| CA | the customer's earliest retirement age which is fundable by the CURRENT SAVINGS (CS) assuming a rate of return of I and e % replacement of basic living expense. A subscript on CA is used for e % when necessary.<br>= customer's age at which: $SS^I_{(x,e\%)} \leq CS$ and $SS^I_{(x-1,e\%)} > CS$. |
| MS | MAXIMUM SAVINGS = largest amount of annual savings that are shown in the report (larger amounts will only be shown in the report when I = $ROR_{mid}$ if the constraints of always showing the PA or not showing customer ages past 70 require it.)<br>= max $\{MO_{(CI,OS)} + ME, CS/CI + .05\}$ * CI (rounded to the nearest whole dollar amount) |
| $MA_{e\%}$ | customer's retirement age which is fundable by the MAXIMUM SAVINGS (MS) assuming a rate of return I and e % replacement of basic living expenses.<br>=customer's age at which $SS^I_{(x,e\%)} \leq MS$ and $SS^I_{(x-1,e\%)} > MS$. |

Once the internal variables are determined (step 310), $STAR_1$ is determined in accordance with the following rules (step 320) (Note: The I or i superscripts on the variables used in the six CPRs refers to the middle rate of return ($ROR_{mid}$)) .:

```
/* If, based on the current savings level and at 100% replacement of basic living expenses, the
customer can find retirement at an age less than or equal to the preferred age, set STAR1 to
an age younger than or equal to the preferred age. */
Case: CA ≤ PA
        If CS ≥ .33 (SS^I_(CA-1,100%) − SS^I_(CA,100%)) + SS^I_(CA,100%)
           Then If SS^I_(CA-1,100%) ≤ max {.33xCI, MS}
                   Then STAR_1 = CA − 1
                   Else STAR_1 = CA
                Else STAR_1 = CA
EndCase
/* Otherwise, set STAR1 to the greater of the preferred age or the age the customer could
fund retirement considering Maximum Savings. Note that STAR1 is not set to an unrealistic
retirement age - it is set to an age which the customer could afford with savings that are at or
less than the customer's maximum savings*/
Case: CA > PA
        STAR_1 = max {M_100%, PA}
EndCase
```

Next, the percentage of basic living expenses to be replaced in retirement under the second retirement expense level, e%, and the retirement age to be highlighted for the second expense level, $STAR_2$ are determined in accordance with the following rules (step 330)

```
/*      If STAR1 is less than PA, the customer can afford to retire at an age earlier than the
        preferred retirement age (considering current savings level). If the customer waits to
        retire to the preferred age, the customer may be able to increase expenses during
        retirement */
Case: STAR₁ < PA
        e % = 110
        While SSⁱ₍PA,e%₎ < CS and SSⁱ₍STAR1,e%₎ < max{.5xCI, MS} and e % < 140
            e % = e % + 5
        EndWhile
        If SSⁱ₍PA,e%₎ ≤ CS and SSⁱ₍PA-1,e %₎ > CS
                Then STAR₂ = PA    /* set STAR₂ to the preferred age PA if PA is the
                                      youngest age that that the customer could fund
                                      considering the current savings level at e % */
            Else
                    If CS ≥ .33(SSⁱ₍CA-1,e%₎ - SSⁱ₍CA,e%₎) + SSⁱ₍CA,e%₎  /*otherwise, STAR2
                                                                            is set to CA or CA - 1
                                                                            */
                        Then If SSⁱ₍CA-1,e%₎ ≤ max{.33xCI, MS}
                                Then STAR₂ = CA - 1
                                Else STAR₂ = CA
                        Else STAR₂ = CA
        If STAR₂ > PA    /* If, however, STAR2 is now greater than the preferred retirement
                            age, set STAR2 to the preferred age - at the second retirement
                            expense level, we do not want to highlight an age that is greater than
                            the customer's preferred age */
                Then STAR₂ = PA
EndCase
Case: STAR₁ = PA
        If SSⁱ₍PA,100₎ > CS
                Then e % = 90
                If SSⁱ₍PA,e%₎ < CS
                        Then e % = 110
        If SSⁱ₍PA,100₎ ≤ CS
                Then e % = 110
                While SSⁱ₍PA,e%₎ < CS and e % < 140
                        e % = e % + 5
                EndWhile
        If SSⁱ₍PA,e%₎ ≤ MS
                Then STAR₂ = PA
                Else STAR₂ = MAₑ %
EndCase
/* If STAR1 is greater than PA, the customer probably cannot fund retirement at the preferred
age considering the current savings level and 100% replacement of basic living expenses.
Since the customer has identified that saving more now is preferable to reducing expenses in
retirement, the second retirement expense level is reduced only to the point that it is below
where the customer could find retirement based on Maximum Savings. MR % and RR
provide further limits to the reducing in e %. */
Case: STAR₁ > PA
        e % = 90
        While SSⁱ₍PA,e%₎ >MS and e % > MR% and RR₍PA,e%-5₎ ≥ 50
                e % = e % - 5
        EndWhile
/* STAR2 is set to the preferred age if the customer could fund retirement at PA considering a
reduced expense level of e % with an amount of money less than Maximum Savings. If not,
STAR₂ reflects an upward adjustment to the customer's retirement age.*/
        If SSⁱ₍PA,e%₎ ≤ MS
                Then STAR₂ = PA
                Else STAR₂ = MAₑ%
EndCase
```

Additional retirement years $AA_1$ and $AA_2$ are determined if STAR1, STAR2, and PA are not unique ages since the exemplary system requires that three different retirement ages be displayed in the Outlook report graphs. For the SAVE/REDUCE/WORK group, AA1 and AA2 are determined in accordance with the rules set forth below (step 340):

```
Case: STAR₁ < STAR₂ and STAR₂ < PA      /* AA1 and AA2 are not necessary since we
                                           already have three unique retirement ages*/
        Quit
EndCase
Case: STAR₁ < PA and STAR₂ = PA
        If PA - STAR₁ > 4
                Then AA₁ = Age x at which Sⁱ₍x,100₎ is closest to (SSⁱSTAR1,100 + SSⁱ₍PA,100₎ +
                    1)/2
                Else AA₁ = max{MAₑ %, STAR₁ - 3}
                    If AA₁ ≥ STAR₁
```

-continued

```
                    Then If STAR₁ = PA − 1
                        Then AA₁ = PA + 1
                        Else AA₁ = Age x at which SS^i_(x,100) is closest to
                            (Ss^i_(STAR1,100) + SS^i_(PA,100) + 1)/2
EndCase
Case: STAR₁ = STAR₂ and STAR₂ < PA
        If STAR₁ = PA − 1
            Then AA₁ = PA + 1
            Else AA₁ = Age x at which SS^i_(x,100) is closest to (SS^i_(STAR1,100) + SS^i_(PA,100) +
                1)/2
EndCase
Case: STAR₁ = PA and e % < 100
        If CS ≥ .33 (SS^I_(CA−1,100%) − SS^I_(CA,100%)) + SS^I_(CA,100%)
            Then If SS^I_(CA−1,100%) ≤ max {.33xCI, MS}
                Then AA₁ = CA − 1
                Else AA₁ = CA
            Else AA₁ = CA
        AA₁ = min[max{AA₁, PA + 1}, PA + 5]
        If SS^i_(AA1,100) + 100 ≤ SS^i_(AA1−1,100) and AA₁ ≠ PA + 1
            Then AA₁ = AA₁ − 1
        AA₂ = max{MA₁₀₀, PA − 5 }
        If AA₂ ≥ PA
            Then If AA₁ = PA + 1
                Then AA₂ = PA − 1
                Else AA₂ = PA + 1
EndCase
Case: STAR₁ = PA and e % > 100
        AA₁ = max{MA₁₀₀, PA − 5}
        If STAR₂ = PA or AA₁
            Then If AA₁ = PA − 1
                Then AA₂ = PA + 1
                Else AA₂ = Age x at which SS^i_(x,100) is closest to (SS^i_(PA,100) + SS^i_(AA1,100)
                    + 1)/2
EndCase
Case: STAR₁ > STAR₂ and STAR₂ > PA
        Quit
EndCase
Case: STAR₁ > PA and STAR₂ = PA
        If STAR₁ − PA > 4
            Then AA₁ = Round((PA + STAR₁)/2)
            Else AA₁ = min[CA₁₀₀ − 1, STAR₁ + 3]
                If AA₁ ≤ STAR₁
                    Then If STAR₁ < 70
                        Then AA₁ = STAR₁ + 1
                        Else AA₁ = 69
                            If AA₁ = PA
                                Then AA₁ = 68
                If SS^i_(STAR1,e %) < .7xCS and SS^i_(AA1,e%) < 7xCS
                    Then AA₁ = Age x at which SS^i_(x+1, e%) < CS and SS^i_(x,e%) ≥ CS
                        If AA₁ ≤ PA or AA₁ ≥ STAR₁
                            Then AA₁ = Age x at which SS^i_(x,e%) is closest to
                                (Ss^i_(PA,e%) + SS^i_(STAR1,e %) + 1)/2
EndCase
Case: STAR₁ = STAR₂ and STAR₂ > PA
        AA₁ = min[min[Age x at which SS^i_(x,100) is closest to CS, STAR₁ + 3], PA +10]
        If STAR₁ = 70 or AA₁ = PA + 10
            Then AA₁ = Round(PA + .75x(STAR₁ − PA) − .01)
EndCase
```

The minimum replacement percent table, and maximum savings table (each required for certain calculations as described above) for the SAVE/REDUCE/WORK preference group are provided below as tables 7 and 8.

TABLE 7

Minimum Replacement Percent Table (MR%)

| Income | Renter | Owner |
|---|---|---|
| $0–$19,999 | 92.00% | 91.00% |
| $20,000–$39,999 | 86.00% | 82.00% |
| $40,000–$59,999 | 80.00% | 74.00% |
| $60,000–$79,999 | ... | ... |
| $80,000–$99,999 | ... | ... |
| $100,000–$124,999 | ... | ... |
| $125,000+ | 68.00% | 64.00% |

TABLE 7-continued

TABLE 8

Maximum Savings Table

| Current Income | CURRENT OUT-OF-POCKET SAVINGS PERCENT | | | | | |
|---|---|---|---|---|---|---|
| | 0–4.9% | 5–7.9% | 8–9.9% | 10–11.9% | 12–13.9% | 14%+ |
| $0–$19,999 | 10.5% | 13.1% | 15.3% | — | — | 19.8% |
| $20,000–$39,999 | 11.7% | 14.5% | 16.6% | — | — | 21.0% |
| $40,000–$59,999 | 13.0% | 15.6% | 17.7% | — | — | 21.7% |
| $60,000–$79,999 | — | — | — | — | — | — |
| $80,000–$99,999 | — | — | — | — | — | — |
| $100,000–$124,999 | — | — | — | — | — | — |
| $125,000–$149,999 | — | — | — | — | — | — |
| $150,000+ | 18.5% | 20.7% | 21.8% | — | — | 24.2% |

(2) SAVE/WORK/REDUCE

If the customer falls into the "SAVE/WORK/REDUCE" customer preference group, the customer has identified the priorities of adjustments to retirement goals as follows:

(1) save more money now;

(2) work longer; and (3) reduce expenses in retirement.

Here, in the exemplary embodiment of the present invention, the system assumes that an option showing reductions to the customer's retirement expense level would be least desirable to the customer. Accordingly, if the system determines that the customer cannot adequately fund retirement at the preferred retirement age with 100% of basic living expenses replaced in retirement, considering the customer's current savings level, the system will determine feasible retirement options, (i) at the expense of saving more money now; (ii) if necessary, at the expense of working longer; and, (iii) as a last resort, at the expense of decreasing expenses during retirement.

Even if the customer can adequately fund retirement at the preferred retirement age with 100% of basic living expenses replaced in retirement, considering the customer's current savings level, the system will determine retirement scenarios in accordance with the customer's priorities. For example, the system may determine a scenario showing that a customer can increase expenses during retirement if more money is saved now.

With respect to the CPR combination (or preference group) SAVE/WORK/REDUCE, three internal variables CA, MS, and $MA_{e\%}$ are calculated in step 310. These three variables are calculated in the same manner as described in connection with the SAVE/REDUCE/WORK preference group above.

Once the internal variables are defined (step 310), $STAR_1$ is determined in a manner similar to that described in connection with the SAVE/REDUCE/WORK preference group. More specifically, $STAR_1$ for the SAVE/WORK/REDUCE preference group is determined in accordance with the following rules (step 320):

Case: $CA \leq PA$
  If $CS \geq .55\ (\ SS^f_{(CA-1,100\%)} - SS^f_{(CA,100\%)}\ ) + SS^f_{(CA,100\%)}$
    Then If $SS^f_{(CA-1,100\%)} \leq \max\ \{.33 \times CI,\ MS\}$
      Then $STAR_1 = CA - 1$
      Else $STAR_1 = CA$
    Else $STAR_1 = CA$
EndCase
Case: $CA > PA$
  $STAR_1 = \max\ \{MA_{100\%},\ PA\}$
EndCase Next, the percentage of basic living expenses to be replaced in retirement under the second retirement expense level, e%, and the retirement age to be highlighted for the second retirement expense level, $STAR_2$ are determined in accordance with the following rules (step 330):

/* Here, the customer can probably fund retirement at an age earlier than the preferred age. Since the customer has indicated that it is not desirable to decrease expense levels in retirement, the customer would most likely be interested in considering retirement scenarios where the customer could actually increase expenses. Accordingly, e % is increased to a point where retirement can still be funded with current saving. */

Case: $STAR_1 < PA$
    $e\% = 110$
    While $SS^i_{(PA,e\%)} < CS$ and $SS^i_{(STAR1,e\%)} < \max\{.5xCI, MS\}$ and $e\% < 140$
        $e\% = e\% + 5$
    EndWhile
    If $SS^i_{(PA,e\%)} \leq CS$ and $SS^i_{(PA-1,e\%)} > CS$
        Then $STAR_2 = PA$
        Else $STAR_2 = $ Age x at which $SS^i_{(x,e\%)} \geq CS$ and $SS^i_{(x+1,e\%)} < CS$
EndCase Case: $STAR_1 = PA$
    If $SS^1_{(PA,100)} \geq CS$
        Then $e\% = 110$
        Else If $SS^i_{(PA,100)} \leq CS$
            Then $e\% = 110$
            While $SS^i_{(PA,e\%)} < CS$ and $e\% < 140$
                $e\% = e\% + 5$
            EndWhile
    If $SS^i_{(PA,e\%)} \leq MS$
        Then $STAR_2 = PA$
        Else $STAR_2 = MA_{e\%}$
EndCase /* If STAR1 is greater than PA, then the customer cannot adequately fund retirement at the preferred age and still maintain the same standard of living (i.e. 100% expense level). Accordingly, e % is increased or reduced as a function of how far they are from meeting their goals*/

Case: $STAR_1 > PA$
    If $STAR_1 - PA > 9$ or $STAR_1 = 70$
        Then $e\% = 90$
        If $SS^i_{(PA+9,e\%) > MS \text{ and } CI > 100000}$
            Then $e\% = 80$
        Else $e\% = 110$
    If $SS^i_{(PA,e\%)} < MS$
        Then $STAR_2 = PA$
        Else If $STAR_1 - PA > 4$ and $STAR_1 - PA < 10$ and $e\% = 110$ and $SS^i_{(STAR1,e\%)}$
        $<$
        $MS + .1xCI$
            Then $STAR_2 = STAR_1$
            Else $STAR_2 = MA_{e\%}$
EndCase Additional retirement years $AA_1$ and $AA_2$ are determined for the SAVE/WORK/REDUCE preference group, if necessary, for the report graphs in accordance with the rules set forth below (step 340):

Case: $STAR_1 < STAR_2$ and $STAR_2 < PA$
    Quit
EndCase
Case: $STAR_1 < PA$ and $STAR_2 = PA$
    If $PA - STAR_1 > 5$
        Then $AA_1$ = Age x at which $SS^i_{(x,100)}$ is closest to $(SS^i_{STAR1,100} + SS^i_{(PA,100)} + 1)/2$
        Else $AA_1 = \max\{MA_{e\%}, STAR_1 - 3\}$
            If $AA_1 \geq STAR_1$
                If $STAR_1 \neq PA - 1$
                      Then If $SS^i_{(STAR1,100)} \geq CS$
                          Then $AA_1$ = Age x at which $SS^i_{(x,100)}$ is
                    closest to $(Ss^i_{(STAR1,100)} + SS^i_{(PA,100)} + 1)/2$
                            Else $AA_1 = STAR_1 - 1$
                      Else
                      If $SS^i_{(PA-2,e\%)} > .5 \times CI$
                          Then $AA_1 = PA + 1$
                          Else $AA_1 = PA - 2$
EndCase
Case: $STAR_1 = STAR_2$ and $STAR_2 < PA$
    If $STAR_1 = PA - 1$
        Then $AA_1 = PA + 1$
        Else $AA_1$ = Age x at which $SS^i_{(x,100)}$ is closest to $(SS^i_{(STAR1,100)} + SS^i_{(PA,100)} + 1)/2$
EndCase
Case: $STAR_1 = STAR_2$ and $STAR_2 = PA$
    $AA_1 = \min[\max\{MA_{100}, PA - 5\}, PA - 1]$
    If $SS^i_{(PA,100)} < CS$ or $SS^i_{(PA,100)}$ is closest to CS
        Then If $AA_1 = PA - 1$
            Then $AA_2 = PA + 1$
            Else $AA_2 = \text{Round}((PA + AA_1)/2)$
        Else $AA_2 = \max\{\min[\text{Age x at which } SS^i_{(x,100)} \text{ is closest to CS}, PA + 5], PA + 1\}$
EndCase
Case: $STAR_1 = PA$ and $STAR_2 > PA$
    $AA_1 = \min[\text{Age x at which } SS^i_{(x,100)} \text{ is closest to CS}, STAR_2 + 4]$
    If $AA_1 = PA$ or $AA_1 = STAR_2$
        Then $AA_1$ = Age x at which $SS^i_{(x,100)}$ is next closest to CS
    If $AA_1 = PA$ or $AA_1 = STAR_2$
        Then $AA_1$ = Age x at which $SS^i_{(x,100)}$ is closest to $(SS^i_{(PA,100)} + SS^i_{(STAR2,100)} + 1)/2$
    If $AA_1 = PA$ or $AA_1 = STAR_2$
        Then If $SS^i_{(STAR2+1,100)} < .5 \times CS$ or $SS^i_{(STAR2,100)} < CS$
            Then $AA_1 = PA - 1$
            Else $AA_1 = STAR_2 + 1$
EndCase
Case: $STAR_1 > STAR2$ and $STAR2 > PA$
    Quit
EndCase
Case: $STAR_1 > PA$ and $STAR_2 = PA$
    If $STAR_1 - PA > 5$ or $STAR_1 = 70$
        Then $AA_1$ = Age x at which $SS^i_{(x,100)}$ is
        closest to $(SS^i_{(PA,100)} + SS^i_{(STAR1,100)} + 1)/2$
            If $STAR_1 = 70$ and $PA + 1 = 70$
                Then $AA_1 = PA - 1$
        Else $AA_1 = \min[\text{Age x at which } SS^i_{(x,100)} \text{ closest to CS}, STAR_1 + 3]$
            If $AA_1 \leq STAR_1$
                Then If $STAR_1 = PA + 1$
                      Then $AA_1 = PA - 1$
                      Else $AA_1$ = Age x at which $SS^i_{(x,100)}$ is closest to
                  $(Ss^i_{(PA,100)} + SS^i_{(STAR1,100)} + 1)/2$
EndCase
Case: $STAR_1 > PA$ and $STAR_1 = STAR_2$
    $AA_1 = \min[\text{Age x at which } SS^i_{(x,100)} \text{ is closest to CS}, STAR_1 + 3]$
    If $AA1 = STAR_1$
        Then $AA_1 = STAR_1 + 1$
If $STAR_1 = 70$
        Then $AA_1 = \text{Round}(PA + .75 \times (STAR_1 - PA) - .01)$
            If $PA = 69$
                Then $AA_1 = PA - 1$
    If $AA_1 = STAR_1$
        Then $AA_1 = STAR_1 - 1$
EndCase
Case: $STAR_1 > PA$ and $STAR_2 > STAR_1$
    Quit
EndCase The maximum savings table (required for certain calculations as described above) for the SAVE/WORK/REDUCE preference group is provided below as table 9 below):

TABLE 9

Maximum Savings Table

| Current Income | CURRENT OUT-OF-POCKET SAVINGS PERCENT | | | | | |
|---|---|---|---|---|---|---|
| | 0–4.9% | 5–7.9% | 8–9.9% | 10–11.9% | 12–13.9% | 14%+ |
| $0–$19,999 | 9.8% | 12.4% | 14.6% | — | — | 19.2% |
| $20,000–$39,999 | 11.1% | 13.8% | 15.9% | — | — | 20.4% |
| $40,000–$59,999 | 12.4% | 15.0% | 17.1% | — | — | 21.2% |
| $60,000–$79,999 | — | — | — | — | — | — |
| $80,000–$99,999 | — | — | — | — | — | — |
| $100,000–$124,999 | — | — | — | — | — | — |
| $125,000–$149,999 | — | — | — | — | — | — |
| $150,000+ | 18.0% | 20.1% | 21.2% | — | — | 23.8% |

(3) REDUCE/SAVE/WORK

Customers that fall into the "REDUCE/SAVE/WORK" customer preference group have identified the priorities of adjustments to retirement goals as follows:

(1) reduce expenses in retirement.

(2) save more money now; and (3) work longer.

Here, like for the SAVE/REDUCE/WORK group, the exemplary system assumes that retirement at the customer's preferred age, is most important to the customer. However, unlike the SAVE/REDUCE/WORK group, retirement adjustments will first be made to the customer's retirement expense level before adjustments are made to the customer's savings level.

With respect to the CPR combination (or preference group) REDUCE/SAVE/WORK, three internal variables CA, MS, and $MA_{e\%}$ are calculated in step 310. These three variables are calculated in the same manner as described in connection with the SAVE/REDUCE/WORK preference group above.

Once the internal variables are defined (step 310), $STAR_1$ is determined in a manner similar to that described in connection with the SAVE/REDUCE/WORK preference group. More specifically, $STAR_1$ for the REDUCE/SAVE/WORK preference group is determined in accordance with the following rules (step 320):

```
Case: CA ≤ PA
    If CS ≥ .55 ( SS'(CA-1,100%) - SS'(CA,100%) ) + SS'(CA,100%)
        Then If SS'(CA-1,100%) ≤ max {.33 × CI, MS}
            Then STAR₁ = CA - 1
            Else STAR₁ = CA
        Else STAR₁ = CA
    EndCase
Case: CA > PA
    STAR₁ = max {MA 100%, PA}
    EndCase
```

Next, the percentage of basic living expenses to be replaced in retirement under the second expense level, e%, and the retirement age to be highlighted for the second retirement expense level, $STAR_2$ are determined in accordance with the following rules (step 330):

```
Case: STAR₁ < PA
    e % = 110
    While SSⁱ₍PA,e%₎ is not closest to CS and SSⁱ₍STAR1,e%₎ < max {.5xCI, MS} and e % < 140
        e % = e % + 5
    EndWhile
    If SSⁱ₍PA,e%₎ ≤ CS and SSⁱ₍PA-1,e%₎ > CS
        Then STAR₂ = PA
        Else STAR₂ = Age x at which SSⁱ₍x,e%₎ ≥ CS and SSⁱ₍x+1,e%₎ < CS
    If e % = 140 and STAR₂ ≠ PA
        Then If SSⁱ₍STAR2,135₎ is closer to CS
            Then e % = 135
EndCase
/* Bias toward reducing e % */
Case: STAR₁ = PA
    If SSⁱ₍PA,100₎ > CS
        Then e % = 90
        While SSⁱ₍PA,e%-5₎ > CS and e % > MR %
            e % = e % - 5
        EndWhile
    Else If SSⁱ₍PA,e%₎ < CS
        Then e % = 110
        If SSⁱ₍PA,e%₎ > MS
            Then e % = 90
    If SSⁱ₍PA,e%₎ > CS
        Then STAR₂ = STAR₁
        Else
            If CS ≥ .55(SSⁱ₍CA-1,e%₎ - SSⁱ₍CA,e%₎ + SSⁱ₍CA,e%₎)
                Then If SSⁱ₍CA-1,e%₎ ≤ max{.33xCI, MS}
                    Then STAR₂ = CA - 1
                    Else STAR₂ = CA
                Else STAR₂ = CA
EndCase
Case: STAR1 > PA
    e% = 90
    While SSⁱ₍PA,e%-5₎ > CS and e % > MR% /* Bias toward reducing e % */
        e % = e % - 5
        If((RR_e% < .5 or e % = 80) and SSⁱ₍PA,e%₎ ≤ MS) or (RR_e% ≤ .5 and e% ≤ 80)
            Then Quit
    EndWhile
    If SSⁱ₍PA,e%₎ < MS
        Then STAR₂ = PA
        Else STAR₂ = MA_e%
EndCase
```

Additional retirement years AA and AA₂ are determined for the REDUCE/SAVE/WORK preference group, if necessary, for the report graphs in accordance with the rules set forth below (step 340):

```
Case: STAR₁ < STAR₂ and STAR₂ < PA
    Quit
EndCase
Case: STAR₁ < PA and STAR₂ = PA
    If PA - STAR₁ > 4
        Then AA₁ = Age x at which SSⁱ₍x,100₎ is closest to (SSⁱ₍STAR1,100₎ + SSⁱ₍PA,100₎ + 1)/2
        Else AA₁ = max{MA_e%, STAR1 - 3}
            If AA₁ ≥ STAR₁
                Then AA₁ = Age x at which SSⁱ₍x,100₎ is closest to (SS1₍STAR1,100₎ + SSⁱ₍PA,100₎ + 1)/2
            If AA₁ = STAR₁ and STAR₁ = PA - 1
                Then AA₁ = PA + 1
            If SSⁱ₍PA,100₎ ≤ CS and SS1₍STAR1,100₎ ≤ CS and SSⁱ₍AA1,100₎ ≤ CS
                Then AA₁ = STAR₁ - 1
EndCase
Case: STAR₁ = STAR₂ and STAR₂ < PA
    If STAR₁ = = PA - 1
        Then AA₁ = PA + 1
        Else AA₁ = Age x at which SSⁱ₍x,100₎ is closest to (SSⁱ₍STAR1,100₎ + SSⁱ₍PA,100₎ + 1)/2
EndCase
Case: STAR₁ = STAR₂ and STAR₂ = PA
    AA₁ = min[max{MA₁₀₀, PA - 5}, PA - 1]
    If SSⁱ₍PA,100₎ ≤ CS
        Then AA₂ = Round((PA + AA₁)/2)
        Else AA₂ = max{min[(Age x at which SSⁱ₍x,100₎ is closest to CS, PA + 5], PA + 1}
```

-continued

```
        If AA₂ = PA
                Then AA₂ = PA + 1
EndCase
Case: STAR₁ = PA and STAR₂ < PA
        AA₁ = max{MA₁₀₀, STAR₂ - 3)
        If STAR₂ = PA - 1 = AA₁
                Then AA₁ = PA + 1
EndCase
Case: STAR₁ >STAR₂ and STAR₂ > PA
        Quit
EndCase
Case: STAR₁ > PA and STAR₂ = PA
        If STAR₁ - PA > 3
                Then AA₁ = Age x at which SSⁱ₍ₓ,₁₀₀₎ is closest to (SSⁱ₍PA,₁₀₀₎ + SSⁱ₍STAR1,₁₀₀₎ +
                        1)/2
                Else AA₁ = min[Age x at which SSⁱ₍ₓ,₁₀₀₎ ≧ CS and SSⁱ₍ₓ₊₁,₁₀₀₎ > CS, STAR₁ + 3]
                        If AA₁ = STAR₁
                                Then AA₁ = STAR₁ + 1
                        If STAR₁ = 70
                                Then AA₁ = min[69, Round(PA + .75(STAR₁ - PA) - .01)]
                        If SSⁱ₍AA1,e%₎ ≧ .5xCS and SSⁱ₍STAR1,e%₎ < .5xCS
                                Then AA₁ = Age x at which SSⁱ₍ₓ,e%₎ is closest to CS
                        If AA₁ = PA
                                Then AA₁ = PA + 1
                        If STAR₁ = PA + 1 = AA₁
                                Then AA₁ = PA + 2
EndCase
Case: STAR₁ > PA and STAR₁ = STAR₂
        AA₁ = min[min[Age x at which SSⁱ₍ₓ,₁₀₀₎ ≧ CS and SSⁱ₍ₓ₊₁,₁₀₀₎ < CS, STAR₁ + 3], PA + 10]
        If STAR₁ = 70 or AA₁ = PA + 10
                Then AA₁ = Round(PA + .75x(STAR₁ - PA) - .01)
EndCase
```

The minimum replacement percent table and maximum savings table for the REDUCE/SAVE/WORK preference group is provided below as tables 10 and 11:

TABLE 10

Minimum Replacement Table(MR%)

| Income | Renter | Owner |
|---|---|---|
| $0–$19,999 | 90.00% | 90.00% |
| $20,000–$39,999 | 82.00% | 81.00% |
| $40,000–$59,999 | 74.00% | 72.00% |
| $60,000–$79,999 | ... | ... |
| $80,000–$99,999 | ... | ... |
| $100,000–$124,999 | ... | ... |
| $150,000+ | 59.00% | 53.00% |

TABLE 11

Maximum Savings Table(MO)

| | CURRENT OUT-OF-POCKET SAVINGS PERCENT | | | | | |
|---|---|---|---|---|---|---|
| Current Income | 0–4.9% | 5–7.9% | 8–9.9% | 10–11.9% | 12–13.9% | 14%+ |
| $0–$19,999 | 9.8% | 12.4% | 14.6% | — | — | 19.1% |
| $20,000–$39,999 | 11.0% | 13.8% | 15.9% | — | — | 20.3% |
| $40,000–$59,999 | 12.3% | 14.9% | 17.0% | — | — | 21.0% |
| $60,000–$79,999 | — | — | — | — | — | — |
| $80,000–$99,999 | — | — | — | — | — | — |
| $100,000–$124,999 | — | — | — | — | — | — |
| $125,000–$149,999 | — | — | — | — | — | — |
| $150,000+ | 17.8% | 20.0% | 21.2% | — | — | 23.6% |

(4) REDUCE/WORK/SAVE

Customers that fall into the "REDUCE/WORK/SAVE" customer preference group have identified the priorities of adjustments to retirement goals as follows:

(1) reduce expenses in retirement;
(2) work longer; and
(3) save more money now.

For this preference group, the exemplary system assumes that saving more money now is the customer's least desirable retirement goal adjustment. Accordingly, retirement adjustments will first be made to the customer's retirement expense level before adjustments are made to the customer's retirement age. Also adjustments to the customer's retirement age will be made before adjustments to the customer's savings level.

With respect to the CPR combination (or preference group) REDUCE/WORK/SAVE, three internal variables CA, MS, and $MA_{e\%}$ are calculated in step 310. These three variables are calculated in the same manner as described in connection with the SAVE/REDUCE/WORK preference group above. $MA_{(70,e\%)}$ uses the age 70 MS. Additionally, internal variables $CSA_{e\%}$ and ADJ are determined. A brief description of these variables, and a table of values for ADJ are set forth below in tables 12 and 13 respectively:

TABLE 12

| Internal Variable | Description |
|---|---|
| $CSA_{e\%}$ | =The age with estimated savings closest to the customer's current savings for the e% expense graph. |
| ADJ | =An adjustment that depends on PA. |

TABLE 13

| Retirement Ages (PA) | ADJ |
|---|---|
| 50–57 | 5 |
| 58–62 | 4 |
| 63–64 | 3 |
| 65+ | 2 |

Once the internal variables are defined (step 310), $STAR_1$ is determined in a manner similar to that described in connection with the SAVE/REDUCE/WORK preference group. More specifically, $STAR_1$ for the REDUCE/WORK/SAVE preference group is determined in accordance with the following rules (step 320):

```
Case: CA ≤ PA
    If CS ≥ .60 ( SS'(CA-1,100%) − SS'(CA,100%) ) + SS'(CA,100%)
        Then If SS'(CA-1,100%) ≤ max {.33 × CI, MS}
            Then STAR₁ = CA − 1
            Else STAR₁ = CA
        Else STAR₁ = CA
EndCase
Case: CA > PA
    STAR₁ = max {MA 100%, PA}
    If CSA₁₀₀ < STAR₁ and CSA₁₀₀ ≥ PA
        Then STAR₁ = CSA₁₀₀
EndCase
```

Next, the percentage of basic living expenses to be replaced in retirement under the second retirement expense level, e%, and the retirement age to be highlighted for the second retirement expense level, $STAR_2$ are determined in accordance with the following rules (step 330):

```
Case: STAR₁ < PA
    e% = 110
    While SSⁱ(PA,e%) is closest to CS and SSⁱ(STAR1,e%) <
    max{.5xCI,MS} and e% < 140
        e% = e% + 5
    EndWhile
    If SSⁱ(PA,e%) ≤ CS and SSⁱ(PA-1,e%) > CS
        Then STAR₂ = PA
        Else STAR₂ = CSA e%
EndCase
Case: STAR₁ = PA
    If SSⁱ(PA,100) > CS
        Then e% = 90
        While SSⁱ(PA,e%-5) > CS and e e% > MR%
            e% = e% − 5
        EndWhile
        Else e% = 110
            If SSⁱ(PA,e%) > MS + .05xCI
                Then e% = 90
    If SSⁱ(PA,e%) ≥ CS
        Then If CS ≥ .25(SSⁱ(CA-1,e%) − SSⁱ(CA,e%)) + SSⁱ(CA,e%)
            Then If SSⁱ(CA-1,e%) ≤ max{.33xCI,MS}
                Then STAR₂ = CA − 1
                Else STAR₂ = CA
            Else STAR₂ = CA
        Else
            If CS ≥ .60(SSⁱ(CA-1,e%) − SSⁱ(CA,e%)) + SSⁱ(CA,e%)
                Then If SSⁱ(CA-1,e%) ≤ max{.33xCI,MS}
                    Then STAR₂ = CA − 1
                    Else STAR₂ = CA
                Else STAR₂ = CA
EndCase
Case: STAR₁ > PA
    e% = 90
    While SSⁱ(PA,e%-5) > CS and e% > MR%
        e% = e% − 5
        If (e% ≤ 80 and SSⁱ(PA+ADJ,e%) ≤ MS)
           or (RR'(PA,e%) < .5 and e% ≤ 80)
            Then Quit
    EndWhile
    If SSⁱ(PA,e%) ≤ MS
        Then STAR₂ = PA
        Else STAR₂ = MA e%
    If CSA e% < STAR₂
        Then STAR₂ = max{CSA e%,PA}
    If STAR₂ > PA + ADJ and SSⁱ(STAR2,e%) < CS
        Then STAR₂ = max{STAR₂ − 1,PA}
EndCase
```

Additional retirement years $AA_1$ and $AA_2$ are determined for the REDUCE/SAVE/WORK preference group, if necessary, for the report graphs in accordance with the rules set forth below (step 340):

```
Case: STAR₁ < STAR₂ and STAR₂ < PA
    Quit
EndCase
Case: STAR₁ < PA and STAR₂ = PA
    If PA − STAR₁ > 4
        Then AA₁ = Age x at which SSⁱ(x,100) is closest to (SSⁱ(STAR1,100) +
    SSⁱ(PA,100) + 1)/2
        Else AA₁ = max{MA(70,e%),STAR₁ − 3}
            If AA₁ ≥ STAR₁
                AA₁ = Age x at which SSⁱ(x,100) is closest to (SSⁱ(STAR1,100) +
                    SSⁱ(PA,100) + 1)/2
            If AA₁ = STAR₁ and STAR₁ = PA − 1
                Then AA₁ = PA + 1
EndCase
Case: STAR₁ = STAR₂ and STAR₂ < PA
    If STAR₁ = PA − 1
        Then AA₁ = PA + 1
        Else AA₁ = Age x at which SSⁱ(x,100) is closest to (SSⁱ(STAR1,100) +
            SSⁱ(PA,100) + 1)/2
EndCase
Case: STAR₁ = STAR₂ and STAR₂ = PA
    AA₁ = PA − 1
    AA₂ = PA + 1
EndCase
Case: STAR₁ = PA and STAR₂ > PA
    If STAR₂ = PA + 1
        Then AA₁=PA−1
        Else AA₁ = Round((PA + STAR₂)/2)
EndCase
Case: STAR₁ = PA and STAR₂ < PA
    If STAR₂ = PA − 1
        Then AA₁ = PA − 2
        Else AA₁ = Round((PA + STAR₂)/2)
EndCase
Case: STAR₁ > STAR₂ and STAR₂ > PA
    Quit
EndCase
Case: STAR₁ > PA and STAR₂ = PA
    If STAR₁ = PA + 1
        Then AA₁ = PA − 1
        Else AA₁ = Age x at which SSⁱ(x,100) is closest to (SSⁱ(STAR1,100) +
            SSⁱ(PA,100) + 1)/2
EndCase
Case: STAR₁ > PA and STAR₁ = STAR₂
    AA₁ = Round(PA + .75x(STAR₁ − PA) − .01)
EndCase
```

The minimum replacement percent table and maximum savings table (both required for certain calculations as described above) for the REDUCE/WORK/SAVE preference group is provided below as tables 14 and 15:

TABLE 14

Minimum Replacement Table(MR%)

| Income | Renter | Owner |
|---|---|---|
| $0–$19,999 | 90.00% | 90.00% |
| $20,000–$39,999 | 81.00% | 80.00% |
| $40,000–$59,999 | 73.00% | 71.00% |
| $60,000–$79,999 | ... | ... |
| $80,000–$99,999 | ... | ... |
| $100,000–$124,999 | ... | ... |
| $125,000+ | 56.00% | 52.00% |

TABLE 15

Maximum Savings Table (MO)

| Current Income | CURRENT OUT-OF-POCKET SAVINGS PERCENT | | | | | |
|---|---|---|---|---|---|---|
| | 0–4.9% | 5–7.9% | 8–9.9% | 10–11.9% | 12–13.9% | 14%+ |
| $0–$19,999 | 9.7% | 12.3% | 14.5% | — | — | 19.0% |
| $20,000–$39,999 | 10.9% | 13.7% | 15.8% | — | — | 20.2% |
| $40,000–$59,999 | 12.2% | 14.8% | 16.9% | — | — | 21.0% |
| $60,000–$79,999 | — | — | — | — | — | — |
| $80,000–$99,999 | — | — | — | — | — | — |
| $100,000–$124,999 | — | — | — | — | — | — |
| $125,000–$149,999 | — | — | — | — | — | — |
| $150,000+ | 17.7% | 19.9% | 21.2% | — | — | 23.6% |

Table 15 gives the maximum out-of-pocket savings percent for age min[PA+10+ADJ, 70]. The maximum savings for PA to PA+ADJ is CS (CSA may be used). The maximum out-of-pocket savings percent for ages between PA+ADJ and min[PA+10+ADJ, 70] is a linear interpolation of the PA+ADJ and min[PA+10+ADJ, 70] maximum out-of-pocket savings percent.

(5) WORK/REDUCE/SAVE

Customers that fall into the "WORK/REDUCE/SAVE" customer preference group have identified the priorities of adjustments to retirement goals as follows:

(1) work longer;
(2) reduce expenses in retirement; and
(3) save more money now.

For this preference group, like for the REDUCE/WORK/SAVE group, the exemplary system assumes that saving more money now is the customer's least desirable retirement goal adjustment. However, for a customer in the WORK/REDUCE/SAVE group, the customer would prefer to work longer than to reduce expenses in retirement.

With respect to the CPR combination (or preference group) WORK/REDUCE/SAVE, six internal variables CA, MS, $MA_{e\%}$, $MA_{(70,e\%)}$, $CSA_{e\%}$, and ADJ are calculated in step 310. These variables are calculated in the same manner as described in connection with the REDUCE/WORK/SAVE preference group above. However, the table of values for ADJ relevant to the WORK/REDUCE/SAVE group is set forth below in tables 16:

TABLE 16

| Retirement Ages | ADJ |
|---|---|
| 50–54 | 6 |
| 55–59 | 5 |
| 60–62 | 4 |
| 63–64 | 3 |
| 65+ | 2 |

Once the internal variables are defined (step 310), $STAR_1$ for the WORK/REDUCE/SAVE preference group is determined in accordance with the following rules (step 320):

Case: $CA < PA$
  If $CS \geq .60\ (SS^I_{(CA-1,100\%)} - SS^I_{(CA,100\%)}) + SS^I_{(CA,100\%)}$
    Then If $SS^I_{(CA-1,100\%)} \leq \max\ \{.33 \times CI,\ MS\}$
      Then $STAR_1 = CA - 1$
      Else $STAR_1 = CA$
    Else $STAR_1 = CA$
EndCase
Case: $CA > PA$
  $STAR_1 = \max\ \{MA_{100\%},\ PA\}$
  If $CSA_{100} < STAR_1$
    Then $STAR_1 = \max\{CSA_{100}, PA\}$
EndCase Next, the percentage of basic living expenses to be replaced in retirement under the second expense level, $e\%$, and the retirement age to be highlighted for the second retirement expense level, $STAR_2$ are determined in accordance with the following rules (step 330):

Case: $STAR_1 < PA$
  $e\% = 110$
  While $SS^i_{(PA,e\%)}$ is not closest to CS and $SS^i_{(STAR1,e\%)} < \max\{.5 \times CI,\ MS\}$ and $e\% < 140$
    $e\% = e\% + 5$
  EndWhile

```
            If SS^i_(PA,e%) ≤ CS and SS^i_(PA-1,e%) > CS
                    Then STAR_2 = PA
                    Else STAR_2 = CSA_e%
EndCase
Case: STAR_1 = PA
        If SS^i_(PA,100) > CS
                Then e % = 90
                While SS^i_(PA,e%-5) > CS and e % > MR %
                        e % = e % - 5
                EndWhile
                Else % = 110
        STAR_2 = CSA_e%
EndCase
Case: STAR_1 > PA
        e % = 90
        While SS^i_(PA+ADJ,e%) > CS and e % > MR %
                e % = e % - 5
                If e % ≤ 80 and SS^i_(PA+ADJ,e%) ≤ MS
                        Then Quit
        EndWhile
        If e % = 90
                Then If there is an age x ≥ PA with SS^i_(x,85) closer to CS than CSA_90
                        Then e % = 85
        If SS^i_(PA,e%) ≤ MS
                Then STAR_2 = PA
                Else STAR_2 = MA_e%
                        If CS ≥ .45(SS^I_(CA-1,e%) - SS^I_(CA,e%) + SS^I_(CA,e%)
                                Then STAR_2 = min[STAR_2, CA - 1]
EndCase
```

Additional retirement years $AA_1$ and $AA_2$ are determined for the WORK/REDUCE/SAVE preference group, if necessary, for the report graphs in accordance with the rules set forth below (step 340):

```
Case: STAR_1 < STAR_2 and STAR_2 < PA
        Quit
EndCase
Case: STAR_1 < PA and STAR_2 = PA
        If PA - STAR_1 > 4
                Then AA_1 = Age x at which SS^i_(x,100) is closest to
                        (SS^i_(STAR1,100) +
                        Ss^i_(PA,100) + 1)/2
                Else AA_1 = max{MA(70,e%), STAR_1 - 3}
                        If AA_1 ≥ STAR_1
                                AA_1 = Age x at which SS^i_(x,100) is closest to
                                        (SS^i_(STAR1,100)
                                        + SS^i_(PA,100) + 1)/2
                        If AA_1 = STAR_1 and STAR_1 = PA - 1
                                Then AA_1 = PA + 1
EndCase
Case: STAR_1 = STAR_2 and STAR_2 < PA
        If STAR_1 = PA - 1
                Then AA_1 = PA + 1
                Else AA_1 = Age x at which SS^i_(x,100) is closest to (SS^i_(STAR1,100)
                        +
                        Ss^i_(PA,100) + 1)/2
EndCase
Case: STAR_1 = STAR_2 and STAR_2 = PA
        AA_1 = PA - 1
        AA_2 = PA + 1
EndCase
Case: STAR_1 = PA and STAR_2 > PA
        If STAR_2 = PA + 1
                Then AA_1 = PA - 1
                Else AA_1 = Round(PA + STAR_2)/2
EndCase
Case: STAR_1 = PA and STAR_2 < PA
        If STAR_2 = PA - 1
                Then AA_1 = PA + 1
                Else AA_1 = Round((PA + STAR_2)/2
EndCase
Case: STAR_1 > STAR_2 and STAR_2 > PA
        Quit
EndCase
Case: STAR_1 > PA and STAR_2 = PA
        If STAR_1 = PA + 1
                Then AA_1 = PA - 1
                Else AA_1 = Age x at which SS^i_(x,100) is closest to (SS^i_(STAR1,100)
                        +
                        Ss^i_(PA,100) + 1)/2
EndCase
Case: STAR_1 > PA and STAR_1 = STAR_2
        AA_1 = Round(PA + .75x(STAR_1 - PA) - .01)
EndCase
```

The minimum replacement percent table and maximum savings table (both required for certain calculations as described above) for the WORK/REDUCE/SAVE preference group is provided below as tables 17 and 18 respectively:

TABLE 17

| Minimum Replacement Table (MR%) | | |
|---|---|---|
| Income | Renter | Owner |
| $0–$19,999 | 91.00% | 90.00% |
| $20,000–$39,999 | 85.00% | 82.00% |
| $40,000–$59,999 | 80.00% | 75.00% |
| $60,000–$79,999 | ... | ... |
| $80,000–$99,999 | ... | ... |
| $100,000–$124,999 | ... | ... |
| $125,000+ | 68.00% | 66.00% |

TABLE 18

Maximum Savings Table (MO)

CURRENT OUT-OF-POCKET SAVINGS PERCENT

| Current Income | 0–4.9% | 5–7.9% | 8–9.9% | 10–11.9% | 12–13.9% | 14%+ |
|---|---|---|---|---|---|---|
| $0–$19,999 | 9.6% | 12.2% | 14.4% | — | — | 18.9% |
| $20,000–$39,999 | 10.8% | 13.6% | 15.8% | — | — | 20.2% |
| $40,000–$59,999 | 12.1% | 14.8% | 16.9% | — | — | 20.9% |
| $60,000–$79,999 | — | — | — | — | — | — |
| $80,000–$99,999 | — | — | — | — | — | — |
| $100,000–$124,999 | — | — | — | — | — | — |
| $125,000–$149,999 | — | — | — | — | — | — |
| $150,000+ | 17.7% | 19.9% | 21.2% | — | — | 23.6% |

Table 18 gives the maximum out-of-pocket savings percent for age min[PA+10+ADJ,max{PA+5,70}]. The maximum savings for PA to PA+ADJ is CS (CSA may be used). The maximum out-of-pocket savings percent for ages between PA+ADJ and min[PA+10+ADJ, 70] is a linear interpolation of the PA+ADJ and min[PA+10+ADJ, max{PA+5,70}] maximum out-of-pocket savings percents. For age 70 always use the maximum out-of-pocket savings percent from table 18.

(6) WORK/SAVE/REDUCE

Customers that fall into the "WORK/SAVE/REDUCE" customer preference group have identified the priorities of adjustments to retirement goals as follows:

(1) work longer;

(2) save more money now; and (3) reduce expenses in retirement.

For this preference group, the exemplary system assumes that an retirement option indicating a reduction in expenses in retirement is the least desirable for the customer. A customer in the WORK/SAVE/REDUCE group, the customer would prefer to work longer and save more money now.

With respect to the CPR combination (or preference group) WORK/SAVE/REDUCE, six internal variables CA, MS, $MA_{e\%}$, $MA_{(70,e\%)}$, $CSA_{e\%}$, and ADJ are calculated in step 310. These variables are calculated in the same manner as described in connection with the REDUCE/WORK/SAVE preference group above. However, the table of values for ADJ relevant to the WORK/SAVE/REDUCE group is set forth below in table 19:

TABLE 19

| Retirement Ages | ADJ |
|---|---|
| 50–57 | 4 |
| 58–62 | 3 |
| 63–64 | 2 |
| 65+ | 1 |

Once the internal variables are defined (step 310), $STAR_1$ for the WORK/SAVE/REDUCE preference group is determined in accordance with the following rules (step 320):

Case: $CA < PA$
   If $CS \geq .55\ (\ SS^I_{(CA-1,100\%)} - SS^I_{(CA,100\%)}\ ) + SS^I_{(CA,100\%)}$
     Then If $SS^I_{(CA-1,100\%)} \leq \max\ \{.33 \times CI,\ MS\}$
        Then $STAR_1 = CA - 1$
        Else $STAR_1 = CA$
     Else $STAR_1 = CA$
EndCase
Case: $CA > PA$
   $STAR_1 = \max\ \{MA_{100\%},\ PA\}$
   If $CSA_{100} < STAR_1$
     Then $STAR_1 = \max\{CSA_{100}, PA\}$
   If $CA-1 \geq PA+ADJ$
     Then $STAR_1 = \min[CA-1, STAR_1]$
EndCase Next, the percentage of basic living expenses to be replaced in retirement under the second expense level, e%, and the retirement age to be highlighted for the second retirement expense level, $STAR_2$ are determined in accordance with the following rules (step 330):

```
Case: STAR₁ < PA
        e % = 110
        While SSⁱ₍PA,e%₎ is not closest to CS and SSⁱ₍STAR1,e%₎ < max{.5xCI, MS} and e %
< 140
                e % = e %+ 5
        EndWhile
        If SSⁱ₍PA,e%₎ ≦ CS and SSⁱ₍PA−1,e %₎ > CS
                Then STAR₂ = PA
                Else STAR₂ = CSA_e%
EndCase
Case: STAR₁ = PA
        If SSⁱ₍PA,100₎ ≧ CS
                Then e % = 110
                Else If SSⁱ₍PA,100₎ < CS
                        Then e % = 110
                        While SSⁱ₍PA,e%₎ < CS and e % < 140
                                e % = e % + 5
                        EndWhile
        STAR₂ = CSA_e%
EndCase
Case: STAR₁ > PA
        If STAR₁ − PA − ADJ > 9 or STAR₁ = 70
                Then e % = 90
                        If SSⁱ₍PA+9+ADJ,e%₎ > MS and CI > 100000
                                Then e % = 80
                Else e % = 110
        If SSⁱ₍PA,e%₎ < MS
                Then STAR₂ = PA
                Else STAR₂ = MA_e%
        If CSA_e% < STAR₂
                Then STAR₂ = max{PA, CSA_e%}
        If CA − 1 ≦ PA + ADJ
                Then STAR₂ = min[CA − 1, STAR₂]
EndCase
```

Additional retirement years $AA_1$ and $AA_2$ are determined for the WORK/SAVE/REDUCE preference group, if necessary, for the report graphs in accordance with the rules set forth below (step 340):

```
Case: STAR₁ < STAR₂ and STAR₂ < PA
        Quit
EndCase
Case: STAR₁ < PA and STAR₂ = PA
        If PA − STAR₁ > 4
                Then AA₁ = Age x at which SSⁱ₍x,100₎ is closest to (SSⁱ₍STAR1,100₎ + SSⁱ₍PA,100₎
                        +
                        1)/2
                Else AA₁ = max{MA₍70,e%₎, STAR₁ − 3}
                        If AA₁ ≧ STAR₁
                                AA₁ = Age x at which SSⁱ₍x,100₎ is closest to (SSⁱ₍STAR1,100₎
                                +
                                        Ssⁱ₍PA,100₎ + 1)/2
                                If AA₁ ≧ STAR₁ and STAR₁ = PA − 1
                                        Then AA₁ = PA + 1
EndCase
Case: STAR₁ = STAR₂ and STAR₂ < PA
        If STAR₁ = PA − 1
                Then AA₁ = PA + 1
                Else AA₁ = Age x at which SSⁱ₍x,100₎ is closest to (SSⁱ₍STAR1,100₎ + SSⁱ₍PA,100₎ +
                        1)/2
EndCase
Case: STAR₁ = STAR₂ and STAR₂ = PA
        AA₁ = PA − 1
        AA₂ = PA + 1
EndCase
Case: STAR₁ = PA and STAR₂ > PA
        If STAR₂ = PA + 1
                Then AA₁ = PA − 1
                Else AA₁ = Round((PA + STAR₂ )/2)
EndCase
Case; STAR₁ > STAR₂ and STAR₂ > PA
        Quit
EndCase
Case: STAR₂ > STAR₁ and STAR₁ > PA
        Quit
EndCase
Case: STAR₁ > PA and STAR₂ = PA
```

-continued

```
        If STAR₁ = PA + 1
            Then AA₁ = PA − 1
            Else AA₁ = Age x at which SSⁱ₍ₓ,₁₀₀₎ is closest to (SSⁱ₍STAR1,100₎ + SSⁱ₍PA,100₎ +
                1)/2
End Case
Case: STAR₁ > PA and STAR₁ = STAR₂
        AA₁ = min[CSA₁₀₀, STAR₁ + 3]
        If AA₁ ≦ STAR₁
            Then If STAR₁ = PA + 1
                Then AA₁ = PA − 1
                Else AA₁ = STAR₁ − 1
        If Abs(SSⁱ₍STAR1,100₎ − SSⁱ₍AA1,100₎) ≦ 100
            Then AA₁ = STAR₁ − 1
        If STAR₁ = 70
            AA₁ = Round(PA + .75x(STAR₁ − PA) − .01)
EndCase
```

The maximum savings tables (required for certain calculations as described above) for the WORK/SAVE/REDUCE preference group is provided below as table 20:

TABLE 20

Maximum Savings Table (MO)

| Current Income | CURRENT OUT-OF-POCKET SAVINGS PERCENT | | | | | |
|---|---|---|---|---|---|---|
| | 0–4.9% | 5–7.9% | 8–9.9% | 10–11.9% | 12–13.9% | 14%+ |
| $0–$19,999 | 9.7% | 12.3% | 14.5% | — | — | 19.0% |
| $20,000–$39,999 | 10.9% | 13.7% | 15.8% | — | — | 20.2% |
| $40,000–$59,999 | 12.2% | 14.8% | 16.9% | — | — | 21.0% |
| $60,000–$79,999 | — | — | — | — | — | — |
| $80,000–$99,999 | — | — | — | — | — | — |
| $100,000–$124,999 | — | — | — | — | — | — |
| $125,000–$149,999 | — | — | — | — | — | — |
| $150,000+ | 17.8% | 20.0% | 21.3% | — | — | 23.7% |

Fail Parameters, Failure Processing and Manual Review:

In the representative embodiment of the present invention, the system will automatically cause manual review of the output if one of the following circumstances occur. The reference numbers are returned as the error code (see table 2):

1. $STAR_2=70$ and $SSi_{(STAR2,e\%)} > MS$.
2. $CA \geq 60$.
3. Two ages on a graph have solution savings below one-half CS and $STAR_1 > PA$.
4. $SS^i_{(x,100)}$ or $SS^i_{x,e\%} > 0.5 \times CI$ for any x on the graphs excluding PA and $STAR_2$ when $e\% < 100$.
5. $STAR_1 > PA+11$.
6. $SS^i_{(max\{PA,STAR1,STAR2,AA1,AA2\},100)} + X \geq SS^i_{(max\{PA,STAR1,STAR2,AA1,AA2\}-1,100)}$ or $SS^i_{(max,\{PA,STAR1,STAR2,AA1,AA2\},e\%)} + X \geq SS^i_{(max\{PA,STAR1,STAR2,AA1,AA2\}-1,e\%)}$, where $X = max\{200, min[1000, Rounded(0.005 \times CI)]\}$.
7. SA for $STAR_1$ or $STAR_2 > max\{70, SA \text{ for } PA+2\}$ and the spouse's income $\geq 10\% \times CI$.
8. $|i_{PA}-i_{STAR1}|, |i_{STAR2}|, |i_{PA}-i_{AA1}|,$ or $|i_{PA}-i_{AA2}| > 0.005$.
9. The decision logic does not choose three distinct ages to show on the Outlook graphs.

For manual review cases, a special output report can be generated by the present invention to enable manual review. The output report can include the decisions made by the expert system, the reason for the failure, the input variables, the estimated savings, the replacement ratio, and any other variables used or calculated by the expert system.

After manual review, the present invention allows for manual input of new or revised decisions. In particular, the operator of the software used in retirement planning is given the option to use the values for the output variables as determined by the system, or the operator may change any of the following:

The three ages to be shown on the report;

$STAR_1$ $STAR_2$ e%

Middle interest rate and age upon which the interest rate is based.

Figure 4A:
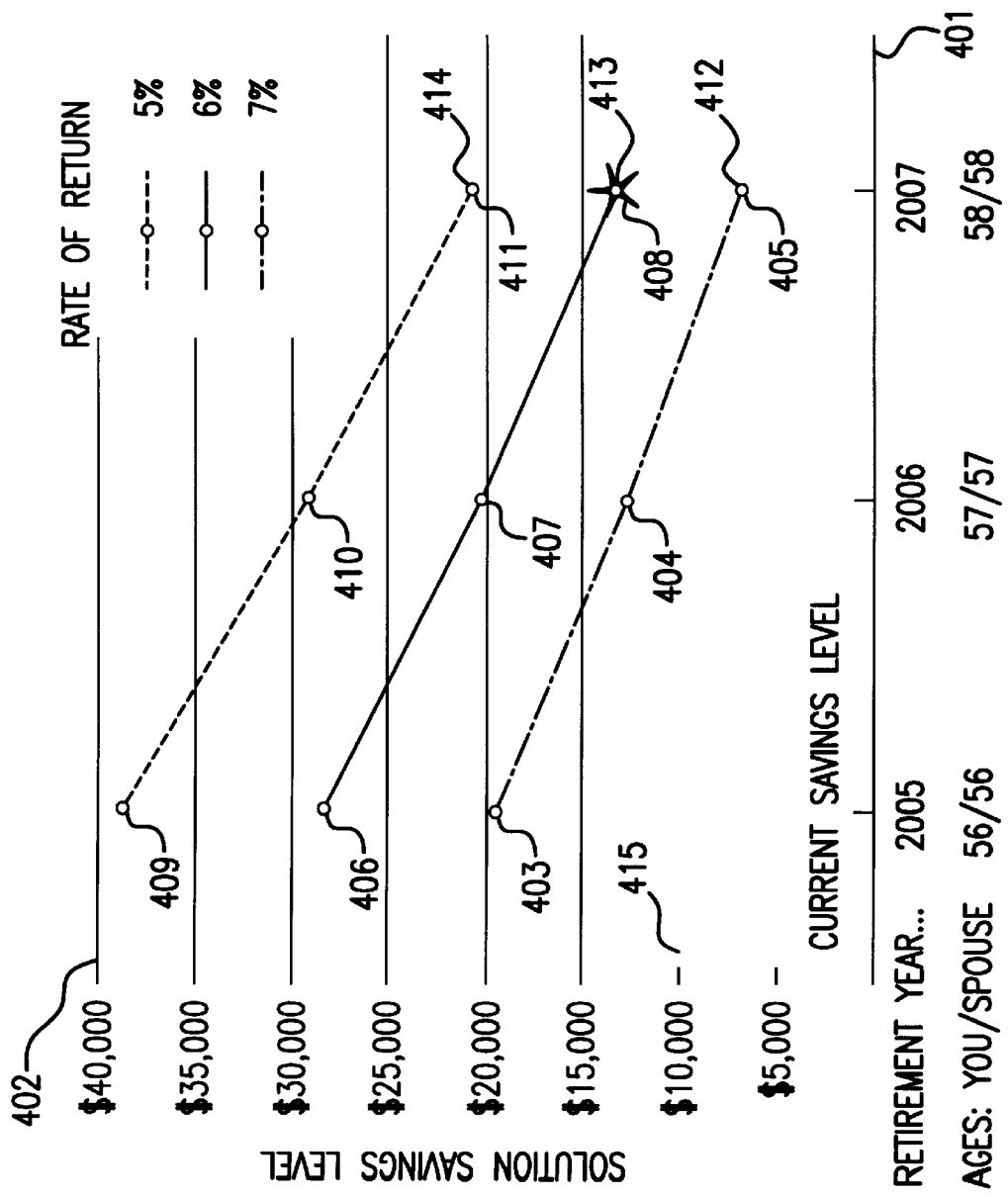
FIG. 4a is an exemplary first graph of retirement options for a customer.
Figure 4B:
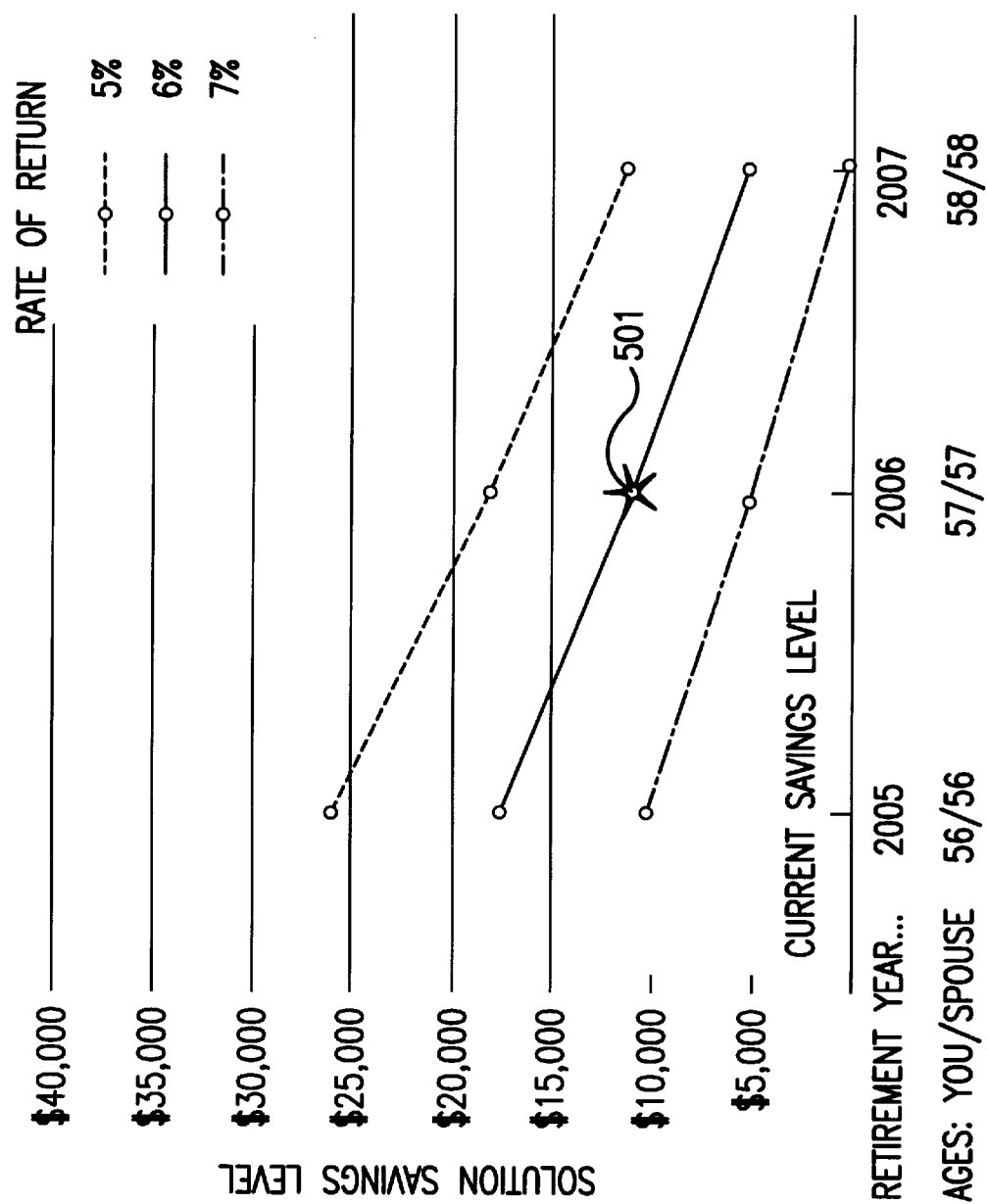
FIG. 4b is an exemplary second graph of retirement options for the customer.

Outlook Report: Once the values for the output variables have been determined, an Outlook report 130 is generated. In the exemplary embodiment, the report includes 18 different retirement scenarios illustrated on two different graphs as shown in FIGS. 4a and 4b. The graphs assume that the values for the output values are as follows:

$ROR_{mid}=6\%$ $ROR_{spread}=1\%$ $STAR_1=58$ $STAR_2=57$ e%=90

PA=56 since $STAR_1$, $STAR_2$, and PA are unique ages, $AA_1$ and $AA_2$ were not calculated.

Using these values, 18 different estimated savings levels are calculated. In particular, estimated savings levels $SS^I_{(x,e\%)}$ are calculated where I $\epsilon\{ROR_{mid}-ROR_{spread}, ROR_{mid}, ROR_{mid}+ROR_{spread}\}$, X $\epsilon\{PA, STAR_2, STAR_1\}$, and e% $\epsilon\{100, e\%$ (i.e, the calculated e% value)$\}$, for each different combination of I, X, and e% value as shown in table 21:

TABLE 21

| e% | I | X |
|---|---|---|
| 100 | 5% | 56 |
| 100 | 5% | 56 |
| 100 | 5% | 56 |
| 100 | 6% | 57 |
| 100 | 6% | 57 |
| 100 | 6% | 57 |
| 100 | 7% | 58 |
| 100 | 7% | 58 |
| 100 | 7% | 58 |
| 90 | 5% | 56 |
| 90 | 5% | 56 |
| 90 | 5% | 56 |
| 90 | 6% | 57 |
| 90 | 6% | 57 |
| 90 | 6% | 57 |
| 90 | 7% | 58 |
| 90 | 7% | 58 |
| 90 | 7% | 58 |

Referring to FIG. 4a, a graph shows 9 of the 18 different retirement scenarios. In particular, all scenarios where e%=100 are plotted and displayed to the user in the form of the illustrated graph. Here, the X-axis 401 represents the retirement age (and year) while the Y-axis 402 represents the estimated savings level. Each of the retirement age-$SS^I_{(x,e\%)}$ points are illustrated as large dots 403–411. Each dot 403–411 at the same rate of return is connected by a line. Accordingly, line 412 represents a 7% rate of return, line 413 represents an 6% rate of return, and line 414 represents a 5% rate of return. One dot 408 is highlighted (as illustrated, it is represented as a star), representing a retirement age of $STAR_1$, here $STAR_1$=58 at the middle rate of return 6%. This is believed to be the scenario of particular interest to the customer, i.e., the strategy that comes closes to meeting the customer's retirement goals. The graph of FIG. 4a also shows the current savings level CS 415. Using this graph, the customer can determine how much money the customer should be saving annually to meet retirement goals. Here, to retire at the age of 58 considering a 6% rate of return on savings, the customer should increase the customer's savings level to $13,500 (star 408). To retire a year earlier, considering a rate of return of 6%, the customer would need to increase savings to a little over $20,000 a year (dot 407).

The graph of FIG. 4b answers the question: what if the customer reduces the customer's standard of living in retirement? In this graph, (the retirement age,$SS^I_{(X,e\%)}$) points are plotted where e%=90. As illustrated by star 501, if the customer increases annual savings to $11,000, the customer could fund retirement at age 57, considering a 6% rate of return, if the customer reduces the standard of living in retirement to 90% replacement of basic living expenses.

Determination of Annual Savings Level Needed for a Given Retirement Scenario

For a given retirement scenario (combination of financial information, retirement year, percentage of Basic Living Expenses (BLE and rate of return), the software system used in retirement planning executes the following steps to determine the annual savings level needed:
1. Estimate the total income needed for each year in retirement.
2. Estimate total income available from sources other than savings each year in retirement. For example, Social Security, employer defined benefit pensions, other pensions already being received, rental income.
3. Calculate the difference (1–2) for each retirement year.
4. Calculate the present value of all of the annual amounts in 3 as of the retirement date.
5. Use a converging iteration algorithm to find the minimum positive future savings level (within desired tolerance) for which the accumulated value of the customer's current assets and future savings will be>the value in 4 by the retirement date.

As will be understood by those of skill in the art, the present invention determines and displays reasonable retirement scenarios. The scenarios displayed are determined based in part on a customer's prioritization of adjustments to retirement goals in order to ensure a more comfortable retirement.

The expert system of the present invention has a design that facilitates possible future modifications and enhancements. The system design allows flexibility with respect to the specific variables and logic employed. Enhancements may include, for example, use of additional input fields, changes in the decision logic or expansion of the table values.

When the terms "system used in retirement planning" and "software system used in retirement planning" are used herein, they should not be understood as covering a system that addresses all aspects of retirement planning. Thus, the terms "retirement planning system" and "retirement planning software" should be read to include any tool used in retirement planning. For example, a system that does not address aspects of insurance needs, estate planning and asset allocation should still be regarded as a system used in retirement planning. Although intended for use in retirement planning, the present invention may also be used in other forms of financial planning.

The expert system of the present invention can be implemented utilizing a logic circuit or a computer memory comprising encoded computer-readable instructions, such as a computer program. The functionality of the logic circuit or computer memory is described in detail above.

While the present invention has been particularly shown and described with reference to an exemplary embodiment thereof, it will be understood by those skilled in the art that various changes in form and details may be made therein without departing from the spirit and scope of the invention.

What is claimed is:

1. For use in a computerized system used for financial retirement planning executing on a computer processor, a computer expert system for determining which retirement scenarios to include in a graphical output report, comprising:

input means for receiving (a) financial data including estimated savings levels required for a plurality of retirement scenarios, (b) an investor profile indicating a tolerance to investment risk, (c) a preferred retirement age, and (d) one of a plurality of preference rankings of possible steps that could be taken to modify a retirement scenario;

a plurality of sets of decision rules, each set of decision rules associated with one of the plurality of preference rankings;

means for determining a hypothetical middle rate of return as a function of the investor profile and an average time assets are expected to remain invested assuming retirement at the preferred retirement age;

means for determining a hypothetical low rate of return and a hypothetical high rate of return as a function of the hypothetical middle rate of return and the investor profile;

means, utilizing the set of decision rules associated with the input preference ranking, for determining a first retirement age assuming basic living expenses in retirement equivalent to current basic living expenses and being a financially feasible retirement age likely to be of interest based upon the financial data, the input preference ranking and the preferred retirement age;

means, utilizing the set of decision rules associated with the input preference ranking, for determining a second retirement expense level based on a percentage of current basic living expenses that is financially feasible and likely to be of interest based upon the input financial data, preference ranking and the preferred retirement age;

means, utilizing the set of decision rules associated with the input preference ranking, for determining a second retirement age assuming the second retirement expense level and being a financially feasible retirement age likely to be of interest based upon the input financial data, preference ranking and the preferred retirement age;

means, utilizing the set of decision rules associated with the input preference ranking, for optionally determining up to two additional retirement ages being financially feasible retirement ages likely to be of interest based upon the input financial data preference ranking and the preferred retirement age if the preferred retirement age, the first retirement age and the second retirement age are not unique; and output means for generating a graphical output report illustrating a plurality of retirement scenarios including two graphs, the first graph assuming basic living expenses in retirement equivalent to current basic living expenses, the second graph assuming the second retirement expense level, each graph having a first axis including the preferred retirement age, the first retirement age, the second retirement age and the additional retirement ages if applicable, each graph having a second axis including a plurality of estimated savings levels, each graph including plots representing the estimated savings levels corresponding to each of said retirement ages assuming the hypothetical low rate of return, the hypothetical middle rate of return and the hypothetical high rate of return, the first graph highlighting the combination (hypothetical middle rate of return, first retirement age), the second graph highlighting the combination (hypothetical middle rate of return, second retirement age).

2. The expert system of claim 1 wherein the preference ranking orders the items (a) save more now, (b) work longer, and (c) reduce expenses in retirement.

3. The system of claim 1 further comprising means for providing manual review and optional manual override prior to generation of the output report.

4. The system of claim 1 further comprising means for automatically providing manual review and optional manual override prior to generation of the output report upon one of a plurality of predefined conditions being satisfied.

5. A computer implemented system for determining retirement scenarios to include in an output report, comprising:

input means for receiving (a) financial data, (b) an investor profile indicating a tolerance to investment risk, (c) a preferred retirement age, and (d) one of a plurality of preference rankings of possible steps that could be taken to modify a retirement scenario;

a plurality of sets of expert system decision rules, each set of expert system decision rules associated with one of the plurality of preference rankings;

means for determining a hypothetical rate of return as a function of the investor profile and an average time assets are expected to remain invested;

means, utilizing the set of expert system decision rules associated with the input preference ranking, for determining a first retirement age assuming an expense level in retirement designed to maintain a current standard of living and being a financially feasible retirement age likely to be of interest based upon the input preference ranking;

means, utilizing the set of expert system decision rules associated with the input preference ranking, for determining a second retirement expense level and for determining a second retirement age assuming the second retirement expense level and being a financially feasible retirement age likely to be of interest based upon the input preference ranking; and output means for providing the hypothetical rate of return, the first retirement age, the second retirement age and the second retirement expense level to a retirement planning system, said output means comprises means for generating the output report as at least two graphs illustrating a plurality of retirement scenarios specifying an estimated amount of annual savings required to fund retirement, the first graph assuming an expense level in retirement designed to maintain to the current standard of living, the second graph assuming the second retirement expense level, each graph having a first axis including the preferred retirement age, the first retirement age and the second retirement age, each graph including a plot representing the hypothetical rate of return, the first graph highlighting the first retirement age and the second graph highlighting the second retirement age.

6. The system of claim 5 wherein the output means further comprises means for generating the output report illustrating a plurality of retirement scenarios in graphical form wherein the first retirement age is highlighted when associated with the expense level in retirement equivalent to the current expense level and wherein the second retirement age is highlighted when associated with the second retirement expense level.

7. A computer implemented system for determining which retirement scenarios to include in a report specifying an estimated amount of annual savings required to fund retirement, comprising:

input means for receiving financial data and one of a plurality of preference rankings of possible steps that could be taken to modify a retirement strategy;

a plurality of sets of expert system decision rules, each set of expert system decision rules associated with one of the plurality of preference rankings;

means, utilizing the set of expert system decision rules associated with the input preference ranking, for determining a first retirement age assuming an expense level in retirement designed to maintain to a current standard of living and being a financially feasible retirement age likely to be of interest based upon the input preference ranking;

means, utilizing the set of expert system decision rules associated with the input preference ranking, for determining a second retirement expense level;

means, utilizing the set of expert system decision rules associated with the input preference ranking, for determining a second retirement age assuming the second retirement expense level and being a financially feasible retirement age likely to be of interest based upon the input preference ranking;

output means for the first retirement age, the second retirement age and the second retirement expense level to a retirement planning system; and means for generating a graphical report illustrating the first financial retirement strategy, the second financial retirement strategy and the third financial retirement strategy.

8. The system of claim 7 wherein the output means further comprises means for generating the report specifying an estimated amount of annual savings required to fund retirement highlighting the first retirement age.

9. The system of claim 7 wherein the output means further comprises means for generating the report specifying an estimated amount of annual savings required to fund retirement highlighting the first retirement age and the second retirement age.

10. A computer-implemented retirement planning graphical report generation system, comprising:

an input device for receiving as input a customer preferred retirement age, a first retirement age being a financially feasible retirement age likely to be of interest to the customer based upon a customer preference ranking and assuming a first retirement expense level, a second retirement age being a financially feasible retirement age likely to be of interest to the customer based upon the customer preference ranking and assuming a second retirement expense level, and a plurality of rates of return; and a report generator for generating a report illustrating a plurality of financial retirement scenarios specifying estimated amounts of annual savings required to fund retirement, the report including two graphs, the first graph assuming the first retirement expense level having a first axis including the first retirement age, the second graph assuming the second retirement expense level having a first axis including the second retirement age, each graph including plots representing each of the plurality of rates of return, the first graph highlighting the first retirement age and the second graph highlighting the second retirement age.

11. The system of claim 10 wherein the first axis of each graph comprises the customer preferred retirement age, the first retirement age and the second retirement age.

12. A computer implemented expert system for aiding a customer in determining appropriate financial retirement strategies towards obtaining a desired standard of living in retirement, comprising:

means for receiving financial information about the customer;

means for receiving customer preference rankings specifying a preferred order of possible steps that could be taken to modify a financial retirement strategy;

means for receiving a customer preferred retirement age;

means for determining a first financial retirement strategy with retirement at the customer preferred retirement age, the first financial strategy specifying the estimated amount of annual savings required to fund retirement at the customer preferred retirement age;

means for determining a second financial retirement strategy with retirement at a first system-selected retirement age assuming an expense level in retirement equivalent to the customer's current standard of living, the first system-selected retirement age being a financial feasible retirement age likely to be of interest to the customer based upon the customer preference rankings, the second financial retirement strategy specifying the estimated amount of annual savings required to fund retirement at the first system-selected retirement age;

means for determining a third financial strategy with retirement at a second system-selected retirement age assuming a retirement standard of living different from the customer's current standard of living, the second system-selected retirement age being a financially feasible retirement age likely to be of interest to the customer based upon the customer preference rankings, the third financial retirement strategy specifying the estimated amount of annual savings required to fund retirement at second system-selected retirement age; and means for generating a graphical report illustrating the first financial retirement strategy, the second financial retirement strategy and the third financial retirement strategy.

13. The system of claim 12 further comprising means for receiving an investor profile indicating a tolerance to investment risk; and means for determining a hypothetical rate of return as a function of the investor profile and an average time which assets are expected to remain invested.

14. The system of claim 13 further comprising means for determining an inflation assumption that is consistent with and corresponds to the hypothetical rate of return.

15. The system of claim 13 further comprising means for determining an income needed each year in retirement and for determining additional savings needed so that customer's assets will provide said income needed.

16. The system of claim 15 further comprising a report generator for generating a report including two graphs, the first graph assuming the expense level in retirement designed to maintain to the customer's current standard of living having a first axis including the first system selected retirement age, the second graph assuming the retirement standard of living different from the customer's current standard of living having a first axis including the second system selected retirement age, each graph including a plot representing the hypothetical rate of return, the first graph highlighting the second financial retirement strategy and the second graph highlighting the third financial retirement strategy.

17. The system of claim 16 wherein the first axis of each graph comprises the customer preferred retirement age, the first system-selected retirement age and the second system-select retirement age.

18. A computer implemented expert system for helping a customer determine appropriate financial retirement strategies towards obtaining a desired standard of living in retirement, comprising:

means for receiving financial information about the customer;

means for receiving customer preference rankings specifying a preferred of order of possible steps that could be taken to modify a financial retirement strategy;

means for determining a first financial retirement strategy with retirement at a first retirement age assuming a first level of expense in retirement, the first retirement age being a financially feasible retirement age likely to be of interest to the customer based upon the customer preference rankings, the first financial retirement strategy specifying the estimated amount of annual savings required to fund retirement at the first retirement age;

means for determining a second financial retirement strategy with retirement at a second retirement age assuming a second level of expense in retirement, the second retirement age being a financially feasible retirement age likely to be of interest to the customer based upon the customer preference rankings, the second financial strategy specifying the estimated amount of annual savings required to fund retirement at second retirement age; and means for generating a graphical report illustrating the first financial retirement strategy and the second financial retirement strategy.

19. A computer implemented expert system for helping a customer determine appropriate financial strategies, comprising:

means for receiving financial information about the customer;

means for receiving customer goals and preference rankings specifying a preferred order of possible steps that could be taken to modify financial goals and strategies for achieving said financial goals;

means for determining a first financial strategy having financial goals set according to the preference rankings, the first financial strategy specifying the estimated amount of annual savings required to obtain the financial goals;

means for determining a second financial strategy having alternative financial goal amounts, the alternative financial goal amounts being financially feasible and likely to be of interest to the customer based upon the preference rankings, the second financial strategy specifying the estimated amount of annual savings required to obtain the alternative financial goals; and means for generating a graphical report illustrating the first financial retirement strategy and the second financial retirement strategy.

20. The system of claim 19 wherein the financial goals and the alternative financial goals include preferred and alternative timings of the goals.

21. For use in a computerized financial retirement planning system executing on a computer processor, a computer implemented method for determining which retirement scenarios to include in a graphical output report, comprising the steps of:

receiving as input (a) financial data including estimated savings levels required for a plurality of retirement scenarios, (b) an investor profile indicating a tolerance to financial risk, (c) a preferred retirement age, and (d) one of a plurality of preference rankings of possible steps that could be taken to modify a retirement scenario;

providing a plurality of sets of decision rules, each set of decision rules associated with one of the plurality of preference rankings;

determining a hypothetical middle rate of return as a function of the investor profile and an average time assets are expected to remain invested assuming retirement at the preferred retirement age;

determining a hypothetical low rate of return and a hypothetical high rate of return as a function of the hypothetical middle rate of return and the investor profile;

utilizing the set of decision rules associated with the input preference ranking to determine a first retirement age assuming basic living expenses in retirement equivalent to current basic living expenses and being a financially feasible retirement age likely to be of interest based upon the financial data, the input preference ranking and the preferred retirement age;

utilizing the set of decision rules associated with the input preference ranking to determine a second retirement expense level based on a percentage of current basic living expenses that is financially feasible and likely to be of interest based upon the financial data/input preference ranking and the preferred retirement age;

utilizing the set of decision rules associated with the input preference ranking to determine a second retirement age assuming the second retirement expense level and being a financially feasible retirement age likely to be of interest based upon the input preference ranking and the preferred retirement age;

optionally, utilizing the set of decision rules associated with the input preference ranking to determine up to two additional retirement ages being financially feasible retirement ages likely to be of interest based upon the input preference ranking and the preferred retirement age if the preferred retirement age, the first retirement age and the second retirement age are not unique; and generating a graphical output report illustrating a plurality of retirement scenarios including two graphs, the first graph assuming basic living expenses in retirement equivalent to a current basic living expenses, the second graph assuming the second retirement expense level, each graph having a first axis including the preferred retirement age, the first retirement age, the second retirement age and the additional retirement ages if applicable, each graph having a second axis including a plurality of estimated savings levels, each graph including plots representing the estimated savings levels corresponding to each of said retirement ages assuming the hypothetical low rate of return, the hypothetical middle rate of return and the hypothetical high rate of return, the first graph highlighting the combination (hypothetical middle rate of return, first retirement age), the second graph highlighting the combination (hypothetical middle rate of return, second retirement age).

22. The method of claim 21 further comprising the steps of:

automatically providing manual review prior to generation of the output report upon one of a plurality of predefined conditions being satisfied; and optionally, manually overriding one or more of the determinations made according to the decision rules.

23. A computer implemented method for determining retirement scenarios to include in an output report, comprising the steps of:

receiving as input (a) financial data, (b) an investor profile indicating a tolerance to financial risk, (c) a preferred retirement age, and (d) one of a plurality of preference rankings of possible steps that could be taken to modify a retirement scenarios;

providing a plurality of sets of expert system decision rules, each set of expert system decision rules associated with one of the plurality of preference rankings;

determining a hypothetical rate of return as a function of the investor profile and an average time for which assets are expected to remain invested;

determining a first retirement age assuming an expense level in retirement designed to maintain the current standard of living and being a financially feasible retirement age likely to be of interest based upon the input preference ranking, said step utilizing the set of expert system decision rules associated with the input preference ranking;

determining a second retirement expense level different from the current standard of living, said step utilizing the set of expert system decision rules associated with the input preference ranking;

determining a second retirement age assuming the second retirement expense level and being a financially feasible retirement age likely to be of interest based upon the input preference ranking, said step utilizing the set of expert system decision rules associated with the input preference ranking; and generating a graphical output report illustrating a plurality of retirement scenarios including two graphs, the first graph assuming basic living expenses in retirement equivalent to a current basic living expenses, the second graph assuming the second retirement expense level, each graph having a first axis including the preferred retirement age, the first retirement age, the second retirement age and the additional retirement ages if applicable, each graph having a second axis including a plurality of estimated savings levels, each graph including plots representing the estimated savings levels corresponding to each of said retirement ages assuming the hypothetical rate of return.

24. The method of claim 23 wherein the step of outputting further comprises the step of generating the output report illustrating a plurality of retirement scenarios in graphical form;

wherein the first retirement age is highlighted when associated with the expense level in retirement equivalent to the current standard of living; and wherein the second retirement age is highlighted when associated with the second retirement expense level.

25. A computer-based method for determining which retirement scenarios to include in a report specifying an estimated amount of annual savings required to fund retirement, comprising the steps of:

receiving as input financial data and one of a plurality of preference rankings of possible steps that could be taken to modify a retirement scenario;

determining a first retirement age assuming an expense level in retirement designed to maintain the current standard of living and being a financially feasible retirement age likely to be of interest based upon the input preference ranking, as a first financial retirement strategy;

determining a second retirement expense level being different from the current standard of living;

determining a second retirement age assuming the second retirement expense level and being a financially feasible retirement age likely to be of interest based upon the input preference ranking, as a second financial retirement strategy; and generating a graphical report illustrating the first financial retirement strategy and the second financial retirement strategy.

26. The method of claim 25 wherein the step of outputting further comprises generating the report specifying an estimated amount of annual savings required to fund retirement highlighting the first retirement age and the second retirement age.

27. The method of claim 25 further comprising the step of providing a plurality of sets of expert system decision rules, each set of expert system decision rules associated with one of the plurality of preference rankings.

28. The method of claim 27 wherein each determining step utilizes the set of expert system decision rules associated with the input preference ranking.

29. A computer-based retirement planning graphical report generation method, comprising the steps of:

receiving as input a customer preferred retirement age, a first retirement age being a financially feasible retirement age likely to be of interest to the customer based upon a customer preference ranking and assuming a first retirement expense level, a second retirement age being a financially feasible retirement age likely to be of interest to the customer based upon the customer preference ranking and assuming a second retirement expense level, and a plurality of rates of return; and generating a report illustrating a plurality of financial retirement scenarios specifying estimated amounts of annual savings required to fund retirement, the report including two graphs, the first graph assuming the first retirement expense level having a first axis including the first retirement age, the second graph assuming the second retirement expense level having a first axis including the second retirement age, each graph including plots representing each of the plurality of rates of return, the first graph highlighting the first retirement age and the second graph highlighting the second retirement age.

30. The method of claim 29 wherein the first axis of each graph plots the customer preferred retirement age, the first retirement age and the second retirement age.

31. A computer implemented method for helping a customer determine appropriate financial retirement strategies towards obtaining a desired standard of living in retirement, comprising the steps of:

receiving financial information about the customer;

receiving customer preference rankings specifying a preferred of order of possible steps that could be taken to modify a financial retirement strategy;

receiving a customer preferred retirement age;

determining a first financial retirement strategy with retirement at the customer preferred retirement age, the first financial retirement strategy specifying the estimated amount of annual savings required to fund retirement at the customer preferred retirement age;

determining a second financial retirement strategy with retirement at a first computer-generated retirement age assuming an expense level in retirement designed to maintain the customer's current standard of living, the first computer-generated retirement age being a financial feasible retirement age likely to be of interest to the customer based upon the customer preference rankings, the second financial retirement strategy specifying the estimated amount of annual savings required to fund retirement at the first computer-generated retirement age;

determining a third financial retirement strategy with retirement at a second computer-generated retirement age assuming a retirement expense level different from the customer's current standard of living, the second computer-generated retirement age being a financial feasible retirement age likely to be of interest to the customer based upon the customer preference rankings, the third financial retirement strategy specifying the estimated amount of annual savings required to fund retirement at second computer-generated retirement age; and generating a graphical report illustrating the first financial retirement strategy, the second financial retirement strategy and the third financial retirement strategy.

32. The method of claim 31 wherein the method is performed on a batch basis such that all receiving steps are performed prior to all determining steps.

33. The method of claim 31 further comprising the steps of:

receiving an investor profile indicating a tolerance to investment risk; and determining a hypothetical rate of return as a function of the investor profile and an average time for which assets are expected to remain invested.

34. The method of claim 33 further comprising the step of determining an inflation assumption consistent with and corresponding to the hypothetical rate of return.

35. The method of claim 33 further comprising the steps of:

determining an income needed each year in retirement assuming the hypothetical rate of return; and determining estimated additional savings needed so that the customer's assets will provide said income needed.

36. A computer implemented method for helping a customer determine appropriate financial retirement strategies towards obtaining a desired standard of living in retirement, comprising the steps of:

receiving financial information about the customer;

receiving customer preference rankings specifying a preferred of order of possible steps that could be taken to modify a financial retirement strategy;

receiving a customer preferred retirement age;

determining a first financial retirement strategy with retirement at the customer preferred retirement age, the first financial retirement strategy specifying the estimated amount of annual savings required to fund retirement at the customer preferred retirement age;

determining a second financial retirement strategy with retirement at a first computer-generated retirement age assuming an expense level in retirement designed to maintain the customer's current standard of living, the first computer-generated retirement age being a financial feasible retirement age likely to be of interest to the customer based upon the customer preference rankings, the second financial retirement strategy specifying the estimated amount of annual savings required to fund retirement at the first computer-oenerated retirement age;

determining a third financial retirement strategy with retirement at a second computer-generated retirement age assuming a retirement expense level different from the customer's current standard of living, the second computer-generated retirement age being a financial feasible retirement age likely to be of interest to the customer based upon the customer preference rankings, the third financial retirement strategy specifying the estimated amount of annual savings required to fund retirement at second computer-generated retirement age; and generating a report including two graphs, the first graph assuming the expense level in retirement designed to maintain the customer's current standard of living having a first axis including the first computer generated retirement age, the second graph assuming the expense level in retirement different from the customer's current standard of living having a first axis including the second computer generated retirement age, each graph including a plot representing the hypothetical rate of return, the first graph highlighting the second financial retirement strategy and the second graph highlighting the third financial retirement strategy.

37. The method of claim 36 wherein the first axis of each graph includes the customer preferred retirement age, the first computer-generated retirement age and the second computer-generated retirement age.

38. A computer implemented method for aiding a customer determine appropriate financial retirement strategies towards obtaining a desired standard of living in retirement, comprising the steps of:

receiving financial information about the customer;

receiving customer preference rankings specifying a preferred of order of possible steps that could be taken to modify a financial retirement strategy;

determining a first financial retirement strategy with retirement at a first retirement age assuming a first level of expense in retirement, the first retirement age being a financially feasible retirement age likely to be of interest to the customer based upon the customer preference rankings, the first financial retirement strategy specifying the estimated amount of annual savings required to fund retirement at the first retirement age;

determining a second financial retirement strategy with retirement at a second retirement age assuming a second level of expense in retirement, the second retirement age being a financially feasible retirement age likely to be of interest to the customer based upon the customer preference rankings, the second financial retirement strategy specifying the estimated amount of annual savings required to fund retirement at second retirement age; and generating a graphical report illustrating the first financial retirement strategy and the second financial retirement strategy.

39. A computer-based method to help a user determine appropriate financial retirement strategies towards obtaining a desired standard of living in retirement, comprising the steps of:

(a) providing financial information relating to the user's financial situation;

(b) providing demographic information about the user;

(c) providing answers to questions concerning the user's tolerance to investment risk;

(d) providing a ranked preference of steps the user could take to improve the user's standard of living in retirement;

(e) providing a preferred retirement date;

(f) determining a hypothetical rate of return based upon the answers to questions concerning the user's tolerance to investment risk and historical investment returns;

(g) utilizing the financial information and the demographic information to determine a first average income needed per year in retirement to maintain a standard of living in retirement similar to the user's present standard of living;

(h) calculating a first yearly estimated savings amount to obtain the first average income needed per year in retirement assuming the hypothetical rate of return, the first yearly estimated savings amount being an amount increased with inflation the user should save per year until retirement at the preferred retirement date;

(i) determining a modified standard of living in retirement based upon the ranked preference;

(j) utilizing the financial information and the demographic information to determine a second average income needed per year in retirement to obtain the modified standard of living;

(k) calculating a second yearly estimated savings amount to obtain the second average income needed per year in retirement assuming the hypothetical rate of return, the second yearly estimated savings amount increased with inflation being an amount the user should save per year until retirement at the preferred retirement date; and (l) generating a graphical report illustrating the first yearly estimated savings amount as a first financial retirement strategy and the second yearly estimated savings amount as a second financial retirement strategy.

40. The method of claim 39 further comprising the steps of:

determining a set of alternative retirement dates; and performing steps (g) and (h) through (l) for each of the alternative retirement dates.

41. The method of claim 39 further comprising the steps of:

determining a set of alternative hypothetical rates of return based upon the answers to questions concerning the user's tolerance to investment risk and historical investment returns; and performing steps (h), (k) and (l) for each of the alternative hypothetical rates of return.

42. The method of claim 39 further comprising the steps of:

determining a set of alternative retirement dates;

determining a set of alternative hypothetical rates of return based upon the answers to questions concerning the user's tolerance to investment risk and historical investment returns; and performing steps (g) and (h) through (l) for each of the alternative retirement dates and each of the alternative hypothetical rates of return.

43. The method of claim 42 further comprising the step of selecting a preferred retirement date and rate of return.

44. The method of claim 42 wherein the step of outputting further comprises the steps of:

outputting the first yearly estimated savings amounts and associated retirement dates and hypothetical rates of return on a first graph; and outputting the second yearly estimated savings amounts and associated retirement dates and hypothetical rates of return on a second graph.

45. A computerized method for determining retirement scenarios, comprising the steps of:

receiving from a customer (1) financial data, (2) a preferred retirement age, and (3) a customer preference ranking of a plurality of steps that could be taken to modify a retirement scenario;

determining a first retirement age assuming an expense level in retirement designed to maintain a current standard of living and being a financially feasible retirement age likely to be of interest to the customer based on the customer preference ranking, as a first financial retirement strategy;

determining a second retirement expense level, and a second retirement age assuming the second retirement expense level, being a financially feasible retirement age likely to be of interest to the customer based on the customer preference ranking as a second financial retirement strategy; and providing a graphical report to the customer illustrating the first financial retirement strategy and the second financial retirement strategy;

wherein said steps of determining are performed by a computer processor based on the received financial data, preferred retirement age, and customer preference ranking.

46. The method of claim 45, wherein the customer preference ranking includes an ordered ranking of the following steps that could be taken to modify a retirement scenario: (1) saving more money before retirement; (2) reducing expenses during retirement and (3) working for a longer period of time before retirement.

47. The method of claim 46, wherein said steps of determining are performed using expert system decision rules associated with the customer preference ranking.

48. A computerized method for illustrating a plurality of savings levels required to fund a plurality of retirement scenarios, comprising the steps of:

receiving financial and retirement data from a customer; and providing a graphical output, using a multi-line plot where each line represents a different retirement scenario, illustrating the plurality of savings levels required to fund retirement, corresponding to a plurality of combinations of assumed retirement ages and assumed rates of return, applicable to the received financial and retirement data;

wherein said step of providing is performed by a computer processor based on the received financial and retirement data.

49. A computerized method for illustrating a plurality of savings levels required to fund a plurality of retirement scenarios, comprising the steps of:

receiving financial and retirement data from a customer; and providing a single graphical output illustrating the plurality of savings levels required to fund retirement, corresponding to a plurality of combinations of assumed retirement ages and assumed rates of return, applicable to the received financial and retirement data;

wherein said step of providing is performed by a computer processor based on the received financial and retirement data; wherein said step of providing comprises providing a plurality of graphical outputs, at least one of the plurality of graphical outputs illustrating the plurality of rates of return and at least one of the plurality of graphical outputs illustrating the plurality of retirement ages.

50. A computerized method for illustrating a plurality of savings levels required to fund a plurality of retirement scenarios, comprising the steps of:

receiving financial and retirement data from a customer; and providing a single graphical output illustrating the plurality of savings levels required to fund retirement, corresponding to a plurality of combinations of assumed retirement ages and assumed rates of return applicable to the received financial and retirement data;

wherein said step of providing is performed by a computer processor based on the received financial and retirement data; wherein the plurality of rates of return comprise a low rate of return, a middle rate of return and a high rate of return, and wherein the graphical output highlights the middle rate of return.

* * * * *

UNITED STATES PATENT AND TRADEMARK OFFICE
CERTIFICATE OF CORRECTION

PATENT NO. : 6,012,043
DATED : 4 January 2000
INVENTOR(S) : William R. ALBRIGHT et al.

It is certified that error appears in the above-identified patent and that said Letters Patent is hereby corrected as shown below:

Title page item [57],

In the Abstract: Lines 1-2: Delete "[retirement planning]";

Line 5: Delete "[Although intended]";

Line 6: Delete entire line;

Line 7: Delete "other forms of financial planning.]".

| Column | Line | |
|---|---|---|
| 53 | 51 | Change "computer-oenerated" to --computer-generated--. |

Signed and Sealed this

Seventeenth Day of April, 2001

*Attest:*

NICHOLAS P. GODICI

*Attesting Officer*  *Acting Director of the United States Patent and Trademark Office*